ns Patent [19]

United States Patent [19]

Schwander

[11] Patent Number: 4,754,024
[45] Date of Patent: Jun. 28, 1988

[54] FIBRE-REACTIVE AZO DYES CONTAINING VINYLSULFONYL OR ANALOGOUS GROUPS

[76] Inventor: Hansrudolf Schwander, Unterm Schellenberg 189,, 4125 Riehen, Switzerland

[21] Appl. No.: 900,243

[22] Filed: Aug. 25, 1986

Related U.S. Application Data

[63] Continuation of Ser. No. 553,397, Nov. 18, 1983, abandoned.

[30] Foreign Application Priority Data

Nov. 19, 1982 [CH] Switzerland .................. 6747/82

[51] Int. Cl.$^4$ .................. C09B 62/507; C09B 62/51; D06P 1/384; D06P 3/66
[52] U.S. Cl. .................. 534/642; 534/573; 534/593; 534/594; 534/603; 534/604; 534/605; 534/640; 534/643
[58] Field of Search .................. 534/642, 643, 573 M

[56] References Cited

U.S. PATENT DOCUMENTS 3,139,422  6/1964  Booth et al. .................. 534/643
3,998,805  12/1976  Koller et al. .................. 534/642 X
4,036,825  7/1977  Fuchs et al. .................. 534/642
4,134,887  1/1979  Fuchs et al. .................. 534/642

FOREIGN PATENT DOCUMENTS 1150978  5/1969  United Kingdom .................. 534/643

*Primary Examiner*—Floyd D. Higel
*Attorney, Agent, or Firm*—Wenderoth, Lind & Ponack

[57] ABSTRACT

The invention relates to reactive dyes of the formula

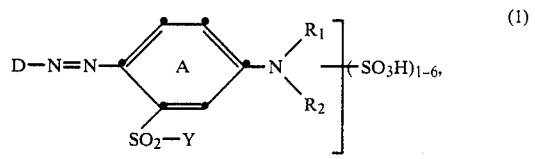

wherein D is the radical of a diazo component, $R_1$ and $R_2$ are each independently an unsubstituted or substituted alkyl or alkenyl group, Y is a —CH=CH$_2$ or —CH$_2$CH$_2$—X radical in which X is a fibre-reactive radical, and the benzene ring A may be further substituted. These dyes are suitable for dyeing and printing textile fibre material and yield dyeings and prints of good fastness properties.

7 Claims, No Drawings

FIBRE-REACTIVE AZO DYES CONTAINING VINYLSULFONYL OR ANALOGOUS GROUPS

This application is a continuation of now abandoned application Ser. No. 553,397, filed Nov. 18, 1983, now abandoned.

Reactive dyes are widely used for dyeing and printing textiles made from fibre materials. In view of the increasing demands made of dyeings obtained with reactive dyes with respect to economy, application technology and fastness standards, the present state of the art is in many respects not entirely satisfactory.

It is the object of the present invention to provide novel improved reactive dyes which have high reactivity and good build-up, which can be dyed with high fixation yield, and which are suitable in particular for the exhaust dyeing process and produce wet- and light-fast dyeings on cellulosic fibre material.

It has been found that this object is accomplished with the novel reactive dyes as defined in this specification.

Accordingly, the present invention relates to reactive dyes of the formula

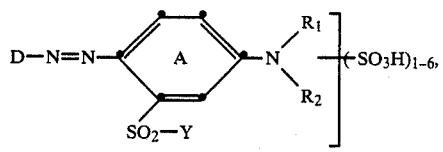

wherein D is the radical of a diazo component, $R_1$ and $R_2$ are each independently an unsubstituted or substituted alkyl or alkenyl group, Y is a $-CH=CH_2$ or $-CH_2CH_2-X$ radical in which X is a fibre-reactive radical, and the benzene ring A may be further substituted.

The radical D is preferably the radical of an aromatic or heterocyclic diazo component, for example a radical of the benzene, naphthalene, anthraquinone, thiazole, thiophene, imidazole, pyridine, indazole, pyrazole, triazole, benztriazole, thiadiazole, isothiazole, benzthiazole, benzisothiazole, phthalimide or phthalohydrazide series. These radicals may contain one or more identical or different substituents. Examples of suitable substituents are: $C_1-C_4$alkyl such as methyl, ethyl, propyl, isopropyl, butyl, isobutyl, sec-butyl or tert-butyl; $C_1-C_4$alkoxy such as methoxy, ethoxy, propoxy, isopropoxy, butoxy, isobutoxy, sec-butoxy or tert-butoxy; carboxy; halogen such as fluorine, chlorine or bromine; cyano, trifluoromethyl or nitro; $C_1-C_4$alkylsulfonyl such as methylsulfonyl, ethylsulfonyl, propylsulfonyl, isopropylsulfonyl or butylsulfonyl; sulfamoyl; N—$C_1-C_{10}$alkylaminosulfonyl such as ethylaminosulfonyl, butylaminosulfonyl or octylaminosulfonyl, N-(phenyl-$C_1-C_4$alkyl)aminosulfonyl such as benzylaminosulfonyl or phenethylaminosulfonyl, N,N-di($C_1-C_6$)alkylaminosulfonyl such as N,N-diethylaminosulfonyl or N-methyl-N-ethylaminosulfonyl, cyclohexylaminosulfonyl, N-$C_1-C_4$alkyl-N-cyclohexylaminosulfonyl such as N-methyl-N-cyclohexylaminosulfonyl or N-propyl-N-cyclohexylaminosulfonyl, phenylaminosulfonyl which may be further substituted in the phenyl ring, e.g. by $C_1-C_4$alkyl, $C_1-C_4$alkoxy, carboxy, halogen or sulfo; naphthylaminosulfonyl which may be further substituted in the naphthalene nucleus, e.g. by hydroxy, nitro or sulfo, phenylsulfonyl which may be further substituted in the phenyl ring by $C_1-C_4$alkyl, $C_1-C_4$alkoxy, carboxy or halogen, e.g. p-methylphenylsulfonyl or p-methoxyphenylsulfonyl, naphthylsulfonyl, phenoxysulfonyl which may be substituted in the phenyl ring by $C_1-C_4$alkyl, $C_1-C_4$alkoxy, carboxy or halogen; phenylsulfonylaminosulfonyl which may be substituted in the phenyl ring by $C_1-C_4$alkyl, $C_1-C_4$alkoxy, carboxy or halogen; benzoyl which may be substituted in the benzene ring by $C_1-C_4$alkyl, $C_1-C_4$alkoxy, carboxy or halogen; N—$C_1-C_{10}$alkylaminocarbonyl, N,N-di($C_1-C_6$)alkylaminocarbonyl, phenylaminocarbonyl which may be substituted in the phenyl ring by $C_1-C_4$alkyl, $C_1-C_4$alkoxy, carboxy or halogen; phenylazo which may be substituted in the phenyl ring by $C_1-C_4$alkyl, $C_1-C_4$alkoxy, carboxy, halogen, sulfomethyl or sulfo; naphthylazo which may be substituted in the naphthalene nucleus by sulfo or hydroxy; β-hydroxyethylsulfonyl, β-sulfatoethylsulfonyl, vinylsulfonyl, hydroxy($C_1-C_4$)alkylaminosulfonyl, sulfato($C_1-C_4$)alkylaminosulfonyl such as β-sulfatoethylaminosulfonyl or γ-sulfatopropylaminosulfonyl, N,N-bis-sulfato($C_1-C_4$)alkylaminosulfonyl such as N,N-bis-β-sulfatoethylaminosulfonyl or N,N-bis-β-sulfatopropylaminosulfonyl, N-$C_1-C_4$alkyl-N-β-sulfatoethylaminosulfonyl such as N-methyl-N-β-sulfatoethylaminosulfonyl or N-ethyl-N-β-sulfatoethylaminosulfonyl; phenyl which may be substituted by $C_1-C_4$alkyl, $C_1-C_4$alkoxy, carboxy, halogen or sulfo, e.g. p-methylphenyl or sulfophenyl; $C_1-C_4$alkylthio such as methylthio or n-butylthio, phenyl-$C_1-C_4$alkylthio such as benzylthio or phenethylthio, sulfato-$C_1-C_4$alkylthio such as β-sulfatoethylthio or β-sulfatopropylthio, benzthiazol-2-yl which may be substituted in the benzene ring by $C_1-C_4$alkyl, $C_1-C_4$alkoxy, carboxy, halogen or sulfo, e.g. 6-methylbenzthiazol-2-yl or 6-methyl-7-sulfobenzthiazol-2-yl; and $C_1-C_4$-alkanoylamino such as acetylamino or propionylamino which may also be fibre-reactive owing to the presence of removable halogen atoms, as e.g. in chloroacetylamino, α,β-dichloropropionylamino or α,β-dibromopropionylamino.

In preferred reactive dyes of the formula (1), D is the radical of a diazo component of the benzene, anthraquinone or heterocyclic series.

The substituents $R_1$ and $R_2$ are each independently alkyl or alkenyl groups of shorter, e.g. $C_1-C_4$, or also longer, e.g., $C_{10}-C_{20}$, hydrocarbon chain which may be straight or branched and may be further substituted, e.g. by $C_1-C_4$alkoxy, hydroxy($C_1-C_4$)alkoxy, $C_1-C_2$alkoxy-$C_1-C_2$-alkoxy, $C_1-C_4$alkoxycarbonyl, carboxy, cyano, hydroxy, halogen, sulfato, thiosulfato or sulfo. $R_1$ and $R_2$ are preferably identical. Examples of $R_1$ and $R_2$ are: methyl, ethyl, propyl, isopropyl, butyl, isobutyl, sec-butyl, tert-butyl, n-hexyl, n-octyl, n-decyl, n-dodecyl, vinyl, 1-propenyl, 2-propenyl, isopropenyl, 2-butenyl, 1,3-butadienyl, 2-pentenyl, β-methoxyethyl, β-ethoxyethyl, β-methoxypropyl, β-(β-hydroxyethoxy)ethyl, β-(β-ethoxyethoxy)ethyl, methoxycarbonylmethyl, ethoxycarbonylmethyl, carboxymethyl, β-carboxyethyl, β-carboxypropyl, β-cyanoethyl, β-hydroxyethyl, β-hydroxybutyl, β-chloroethyl, γ-chloropropyl, γ-bromopropyl, β-chloro-2-propenyl, β-bromo-2-propenyl, γ-chloro-2-propenyl, γ-chloro-2-butenyl, β-sulfatoethyl, β-sulfatopropyl, β-sulfatobutyl, β-thiosulfatoethyl, sulfomethyl, β-sulfoethyl and γ-sulfopropyl.

Suitable examples of the amino group —$NR_1R_2$ are:

N,N-dimethylamino, N,N-diethylamino, N,N-dipropylamino, N,N-diisopropylamino, N,N-di-n-butylamino, N,N-dioctylamino, N,N-didecylamino, N,N-di-2-propenylamino, N-methyl-N-ethylamino, N-ethyl-N-butylamino, N,N-di-β-methoxyethylamino, N,N-di-β-ethoxyethylamino, N,N-di-β-carboxyethylamino, N,N-di-β-cyanoethylamino, N,N-di-β-hydroxyethylamino, N,N-di-β-hydroxypropylamino, N,N-di-β-hydroxybutylamino, N,N-di-β-chloroethylamino, N,N-di-β-chloro-2-propenylamino, N,N-di-β-bromo-2-propenylamino, N,N-di-γ-chloro-2-propenylamino, N,N-di-γ-chloro-2-butenylamino, N,N-di-β-hydroxy-γ-chloropropylamino, N,N-di-β-sulfatoethylamino, N,N-di-β-sulfatopropylamino, N,N-di-β-sulfatobutylamino, N,N-di-β-sulfato-γ-chloropropylamino, N,N-di-β-thiosulfatoethylamino, N,N-di-β-sulfoethylamino and N,N-di-γ-sulfopropylamino.

Preferred reactive dyes of the formula (1) are those in which $R_1$ and $R_2$ are each independently $C_1$-$C_6$alkyl or $C_2$-$C_6$alkenyl, wherein the alkyl or alkenyl groups may be substituted by halogen, sulfato or sulfo.

The fibre-reactive leaving group X is an inorganic or organic radical which can be split off under alkaline conditions.

A suitable inorganic or organic radical which can be split off under alkaline conditions is one of the following groups which can be removed as anion:

—OSO₃H, —SSO₃H, —OCOCH₃, —OPO₃H₂,

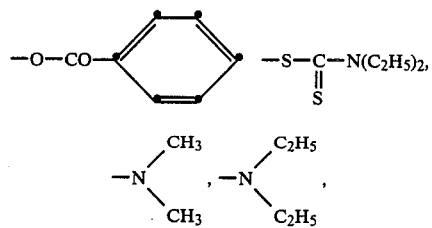

—Cl, —Br, —F,

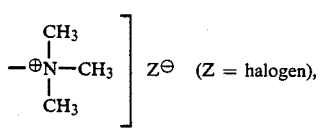

—O—SO₂—N(CH₃)₂, —N—SO₂—CH₃,
　　　　　　　　　　　　　|
　　　　　　　　　　　　　CH₃

—O—SO₂—CH₃, —S—C≡N,

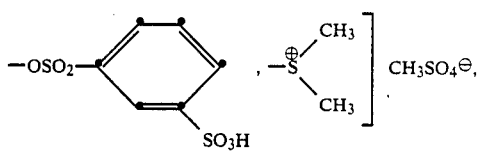

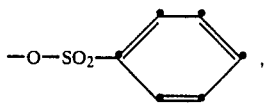

—OOCCCl₃, —OOCCHCl₂, —OOCCH₂Cl,

—O—O₂SR (R = alkyl or aryl), —O—SO₂—N($C_2H_5$)₂,

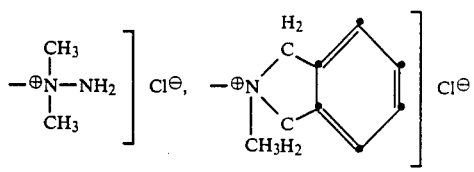

Preferred reactive dyes of the formula (1) are those wherein Y is a —CH₂CH₂—X radical in which X is sulfato.

Examples of further substituents at the benzene ring A are:

$C_1$-$C_4$alkyl groups such as methyl, ethyl, propyl, isopropyl and butyl; $C_1$-$C_4$alkoxy groups such as methoxy, ethoxy, propoxy, isopropoxy and butoxy; $C_1$-$C_6$acylamino groups such as acetylamino and propionylamino, benzoylamino, amino, $C_1$-$C_4$alkylamino, phenylamino, $C_1$-$C_4$alkoxycarbonyl, nitro, cyano, trifluoromethyl, halogen such as fluorine, chlorine and bromine, sulfamoyl, carbamoyl, ureido, carboxy, hydroxy, sulfomethyl and sulfo.

The reactive dyes of the formula (1) contain 1 to 6 sulfo groups. These groups can be attached direct to the aromatic or heterocyclic nucleus of the radical D, to the benzene ring A or to the groups $R_1$ or $R_2$, or they may be present at a substituent as specified above in the definition of possible substituents in the radical D, e.g. in the sulfomethyl or sulfophenyl group. However, the sulfo groups can also be a moiety of sulfato or thiosulfato groups and are accordingly also present in the fibre-reactive leaving group X. Preferably $R_1$ and $R_2$ also contain a sulfo or thiosulfato group.

Examples of diazo and coupling components which may be employed in the process of this invention are listed hereinafter.

Preferred subgroups of reactive dyes of the formula (1) are:

(a) Reactive dyes of the formula (1), wherein D is a radical of the benzene series which may be substituted by $C_1$-$C_4$alkyl, $C_1$-$C_4$alkoxy, carboxy, halogen, cyano, trifluoromethyl, nitro, $C_1$-$C_4$-alkylsulfonyl, N-$C_1$-$C_{10}$alkylaminosulfonyl, N,N-di($C_1$-$C_6$)alkylaminosulfonyl, cyclohexylaminosulfonyl, N-$C_1$-$C_4$alkyl-N-cyclohexylaminosulfonyl, phenylaminosulfonyl which may be substituted in the phenyl ring by $C_1$-$C_4$alkyl, $C_1$-$C_4$alkoxy, carboxy or halogen, phenylsulfonyl which may be substituted in the phenyl ring by $C_1$-$C_4$alkyl, $C_1$-$C_4$alkoxy, carboxy or halogen, phenoxysulfonyl which may be substituted in the phenyl ring by $C_1$–$C_4$alkyl, $C_1$–$C_4$alkoxy, carboxy or halogen, phenylsulfonylaminosulfonyl which may be substituted in the phenyl ring by $C_1$–$C_4$alkyl, $C_1$–$C_4$alkoxy, carboxy or halogen, benzoyl which may be substituted in the benzene ring by $C_1$–$C_4$alkyl, $C_1$–$C_4$alkoxy, carboxy or halogen, N—$C_1$–$C_{10}$alkylaminocarbonyl, N,N-di($C_1$–$C_6$)alkylaminocarbonyl, phenylaminocarbonyl which may be substituted in the phenyl ring by $C_1$–$C_4$alkyl, $C_1$–$C_4$alkoxy, carboxy or halogen, phenylazo which may be substituted in the phenyl ring by $C_1$–$C_4$alkyl, $C_1$–$C_4$alkoxy, carboxy, halogen or sulfo, β-hydroxyethylsulfonyl, β-sulfatoethylsulfonyl, vinylsulfonyl, β-sulfatoethylaminosulfonyl, N,N-bis-β-sulfatoethylaminosulfonyl, N-$C_1$–$C_4$alkyl-N-β-sulfatoethylaminosulfonyl, benzthiazol-2-yl which may be substituted in the benzene ring by $C_1$–$C_4$alkyl, $C_1$–$C_4$alkoxy, carboxy, halogen or sulfo, or by sulfo.

(b) Reactive dyes of the formula (1) or according to (a), wherein $R_1$ and $R_2$ are butyl, 2-propenyl, β-chloro-2-propenyl, β-bromo-2-propenyl, γ-chloro-2-propenyl, γ-chloro-2-butenyl, β-sulfatoethyl, β-sulfatopropyl, β-sulfatobutyl, β-sulfato-γ-chlorpropyl, β-sulfoethyl or γ-sulfopropyl.

(c) Reactive dyes according to (b), of the formula

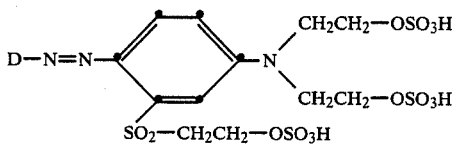

wherein D is the radical of a diazo component of the benzene, anthraquinone or heterocyclic series.

(d) Reactive dyes according to (b) or (c), wherein D is an unsubstituted or substituted anthraquinone radical (e) Reactive dyes according to (d), wherein D is a 1-anthraquinonyl radical.

(f) Reactive dyes according to either (b) or (c), wherein D is an unsubstituted phthalimide, benzthiazole, benzisothiazole, thiadiazole or phthalohydrizide radical.

(g) Reactive dyes according to (f), wherein D is a radical selected from the group consisting of N-cyclohexylphthalimid-3- or -4-yl, benzthiazol-2-yl which may be substituted in the benzene ring by $C_1$–$C_4$alkylsulfonyl or halogen, benzthiazol-5- or -6-yl which may be substituted in the 2-position by $C_1$–$C_4$alkylsulfonyl, 2,1-benzisothiazol-3-yl which may be substituted in the benzene ring by halogen, nitro or sulfo, 1,3,4-thiadiazol-5-yl which may be substituted in the 2-position by phenyl, $C_1$–$C_4$alkylthio, benzylthio or β-sulfatoethylthio, 1,2,4-thiadiazol-5-yl which may be substituted in the 3-position by phenyl or sulfophenyl, or 5-, 6-, 7- or 8-phthalohydrazide which may be substituted at one nitrogen atom by phenyl.

(h) Reactive dyes according to (b) of the formula

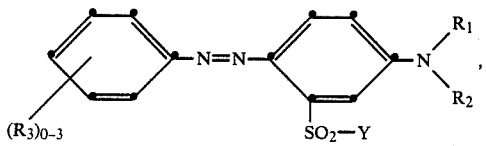

wherein $R_3$ denotes 0 to 3 substituents which may each independently be halogen, cyano, trifluoromethyl, $C_1$–$C_4$alkylsulfonyl, N-$C_1$–$C_8$alkylaminosulfonyl, N,N-di($C_1$–$C_4$)alkylaminosulfonyl, cyclohexylaminosulfonyl, N-methyl-N-cyclohexylaminosulfonyl, phenylaminosulfonyl, carboxyphenylaminosulfonyl, phenylsulfonyl, methylphenylsulfonyl, phenoxysulfonyl, chlorophenoxysulfonyl, phenylsulfonylaminosulfonyl, benzoyl, $C_1$–$C_4$alkylbenzoyl, carboxybenzoyl, N,N-di($C_1$–$C_4$)alkylaminocarbonyl, phenylaminocarbonyl, phenylazo, sulfophenylazo, β-hydroxyethylsulfonyl, β-sulfatoethylsulfonyl, vinylsulfonyl, β-sulfatoethylaminosulfonyl, N,N-bis-β-sulfatoethylaminosulfonyl, N-methyl-N-β-sulfatoethylaminosulfonyl, 6-methylbenzthiazol-2-yl, 6-methyl-7-sulfobenzthiazol-2-yl or sulfo, $R_1$, $R_2$ and Y are as defined in (b), and the reactive dyes of the formula (3) contain 1 to 6 $SO_3H$ groups.

(i) The reactive dye according to (h) of the formula

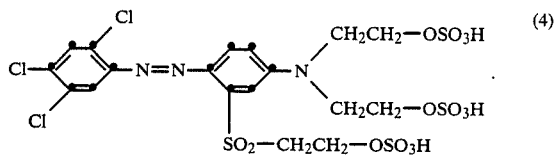

(j) The reactive dye according to (h) of the formula

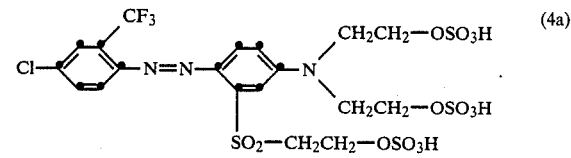

The dyes of the formula (1) are fibre-reactive. By fibre-reactive compounds are meant those compounds which are able to react with the hydroxyl groups of cellulose or with the amino groups of natural or synthetic polyamides to form covalent chemical bonds.

The process for the preparation of the reactive dyes of the formula (1) comprises diazotising a diazo component of the formula $$D\text{—}NH_2 \qquad (5)$$

and coupling the diazonium compound to a coupling component of the formula

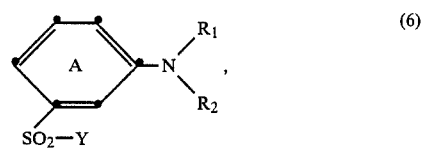

wherein Y is a —CH=$CH_2$ or —$CH_2CH_2$—X radical in which X is a fibre-reactive leaving group or a precursor thereof, and $R_1$, $R_2$ and A are as defined for formula (1), and, if necessary, introducing the desired fibre-reactive leaving group and/or subsequently carrying out a further conversion reaction, the components of the formula (5) and (6) being so chosen and/or the further process steps being so carried out that the final dye contains 1 to 6 $SO_3H$ groups.

In the process described above, the individual process steps can be carried out in varying sequence and in some cases may also be carried out simultaneously. Different variants of the process are thus possible. In general, the reaction is carried out stepwise in succession. In this connection, it depends on the structure of the starting materials which of the possible process variants give the best results or under which special conditions, e.g. at what temperature, the reaction shall most conveniently be carried out.

The diazotisation of the diazo component of the formula (5) is normally carried out by treatment with nitrous acid in an aqueous solution of mineral acid at low temperature, and the coupling to the coupling component of the formula (6) is carried out at neutral to acid pH values.

It is preferred to use diazo components of the formula (5), wherein Y is a —CH$_2$CH$_2$—X radical in which X is a hydroxyl or sulfato group. The introduction of the sulfato group as radical X is effected by sulfating the corresponding hydroxy compound, preferably by reaction with concentrated sulfuric acid at 0° C. to moderately elevated temperature. The sulfation is preferably carried out by adding the hydroxy compound to sulfuric acid monohydrate in the temperature range from 5° to 15° C.

The sulfation can be carried out before or after the coupling. If further aliphatically bonded hydroxyl groups are still present in the radicals D, R$_1$ or R$_2$, these hydroxyl groups can also be converted into sulfato groups by subsequent sulfation.

The coupling components of the formula (6) must contain at least one sulfo group or one aliphatic sulfatable substituent, e.g. a —C$_2$H$_4$—OH group.

The introduction of another inorganic or organic radical for X which may be split off under alkaline conditions into a compound of the formula (1), instead of a hydroxy or sulfato group, for example a thiosulfato, methylmercapto, methylsulfonyl or phosphato group, is effected in a manner known per se.

In the monoazo compound of the formula (1) so obtained, the group X optionally can be varied by transacylation or similar reactions by hydrolysing the monoazo compound of formula (1) and then reacting the hydrolysed compound with a compound which introduces another group X.

Reactive dyes of the formula (1) or diazo components of the formula (5), wherein Y is the vinyl group —CH=CH$_2$, are obtained by eliminating sulfuric acid from the corresponding compounds in which Y is a —CH$_2$CH$_2$—X radical and X is the sulfato group. This elimination generally also takes place under the dyeing conditions employed for vinylsulfone dyes.

Whenever present, a free amino group in the radical D can be converted after the coupling into an acylamino or alkylamino group with an acylating or alkylating agent, respectively.

A suitable acylating agent is e.g. an alkanoyl halide such as acetyl chloride or propionyl chloride. The acylating agent may still contain replaceable substituents in the alkanoyl moiety, so that the acyl radical introduced is fibre-reactive. Examples of such acylating agents are: chloroacetyl chloride, β-chloropropionyl chloride, α,β-dichloropropionyl chloride and α,β-dibromopropionyl chloride. Other fibre-reactive acylating agents are also suitable, e.g. halotriazines or halopyrimidines etc. The condensation of a diazo component of the formula (5) which still contains a free amino group with an acylating agent can be carried out also before the coupling with a coupling component of the formula (6).

If a diazo component of the formula (5) contains an acyl radical which is bonded through an amino group and in which aliphatically bonded hydroxyl groups are present, these hydroxyl groups can also be converted into sulfato groups by sulfation.

The coupling components of the formula (6), wherein R$_1$, R$_2$, Y and A are as defined for formula (1), are novel and constitute a further object of the invention.

The compounds of the formula (6) can be obtained by reacting compounds of the formula

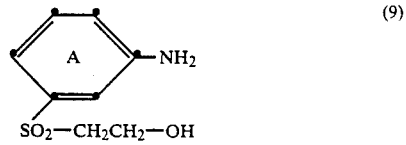

with alkylating agents and optionally introducing the desired fibre-reactive leaving group and/or subsequently carrying out a further conversion reaction.

The starting compounds of the formula (9) are known. The alkylation of the amino group is effected by conventional methods of N-alkylation by substitution, e.g. with alkyl halides, or by addition, e.g. with epoxides. Examples of suitable epoxides are ethylene oxide and epichlorohydrin.

The product obtained by alkylating a compound of the formula (9) can be coupled with a diazotised diazo component and then sulfated, in which case further aliphatically bonded hydroxyl groups are also converted into sulfato groups. However, the coupling component can also be sulfated before the coupling.

Preferred compounds are:
(a) compounds of the formula (6), wherein R$_1$ and R$_2$ are each independently C$_1$-C$_6$alkyl or C$_2$-C$_6$alkenyl in which the alkyl or alkenyl groups can be substituted by halogen, hydroxy, sulfato or sulfo;
(b) compounds of the formula (6), wherein Y is a —CH$_2$CH$_2$—X radical in which X is hydroxy or sulfato;
(c) compounds according to (b), wherein R$_1$ and R$_2$ are butyl, 2-propenyl, β-chloro-2-propenyl, β-bromo-2-propenyl, γ-chloro-2-propenyl, γ-chloro-2-butenyl, β-sulfatoethyl, β-sulfatopropyl, β-sulfatobutyl, β-sulfato-γ-chloropropyl, β-sulfoethyl or γ-sulfopropyl;
(d) compounds according to (c), wherein R$_1$ and R$_2$ are β-hydroxyethyl or β-sulfoethyl, Y is a —CH$_2$CH$_2$—X radical in which X is hydroxy or sulfato, and the benzene ring A is not further substituted;
(e) A compound according to (d) of the formula

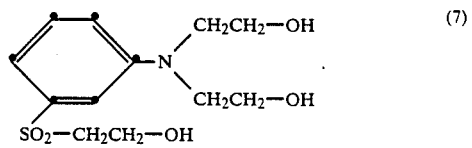

(f) The compound according to (d) of the formula

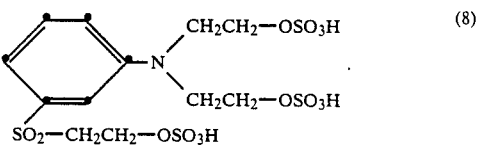

The preferred process for the preparation of the compound of formula (7) comprises reacting a compound of the formula (10)

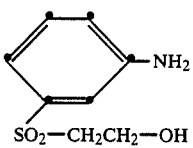

(10)

with ethylene oxide in the molar ratio 1:2. The reaction is conveniently carried out in glacial acetic and at about 40° C.

The compound of formula (7), which is so obtained in good yield, can then be coupled with a diazotised diazo component. The resultant azo compound can subsequently be sulfated to give a dye of the formula

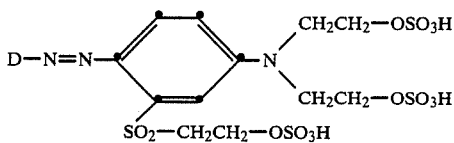

(2)

However, as already stated above, the coupling component of the formula (7) can also be sulfated before the coupling to give the compound of the formula (8).

The compounds of formula (9) used as precursors may be further substituted in the benzene nucleus A, as stated in the definition of formula (1).

The following compounds may be cited as examples of diazo components of the formula (5):
1-amino-2,4,5-trichlorobenzene,
1-amino-4-methylsulfonylbenzene,
1-amino-4-ethylsulfonylbenzene,
1-amino-2-chloro-4-methylsulfonylbenzene,
1-amino-2-bromo-4-methylsulfonylbenzene,
1-amino-2-chloro-4-ethylsulfonylbenzene,
1-amino-2-bromo-4-ethylsulfonylbenzene,
1-amino-2,6-dibromo-4-methylsulfonylbenzene,
1-amino-2,6-dibromo-4-ethylsulfonylbenzene,
1-amino-4-N,N-dimethylaminosulfonylbenzene,
1-amino-4-N,N-diethylaminosulfonylbenzene,
1-amino-4-N,N-di-n-butylaminosulfonylbenzene,
1-amino-2-bromo-4-N,N-dimethylaminosulfonylbenzene,
1-amino-2-bromo-4-N,N-diethylaminosulfonylbenzene,
1-amino-2,5-dichloro-4-N,N-dimethylaminosulfonylbenzene,
1-amino-2,5-dichloro-4-N,N-diethylaminosulfonylbenzene,
1-amino-2,5-dichloro-4-N,N-di-n-butylaminosulfonylbenzene,
1-amino-2,5-dichloro-4-ethylaminosulfonylbenzene,
1-amino-2,5-dichloro-4-β-ethyl-n-hexylaminosulfonylbenzene,
1-amino-2,5-dichloro-4-cyclohexylaminosulfonylbenzene,
1-amino-2,5-dichloro-4-phenylaminosulfonylbenzene,
1-amino-2-chloro-4-phenylaminosulfonylbenzene,
1-amino-2-chloro-5-N,N-diethylaminosulfonylbenzene,
1-amino-2-chloro-5-N,N-di-n-butylaminosulfonylbenzene,
1-amino-2-chloro-5-β-ethyl-n-hexylaminosulfonylbenzene,
1-amino-2-chloro-5-phenylaminosulfonylbenzene,
1-amino-2-chloro-5-o-carboxyphenylaminosulfonylbenzene,
1-amino-3-phenylaminosulfonylbenzene,
1-amino-2-chloro-5-methylsulfonylbenzene,
1-amino-2-chloro-5-ethylsulfonylbenzene,
1-amino-2,6-dibromo-4-ethylaminosulfonylbenzene,
1-amino-2,6-dibromo-4-n-butylaminosulfonylbenzene,
1-amino-2,6-dibromo-4-N,N-dimethylaminosulfonylbenzene,
1-amino-2,6-dibromo-4-N,N-diethylaminosulfonylbenzene,
1-amino-2-N,N-diethylaminosulfonylbenzene,
1-amino-2-N,N-di-n-butylaminosulfonylbenzene,
1-amino-2-N-methyl-N-cyclohexylaminosulfonylbenzene,
1-amino-2-o-chlorphenoxysulfonylbenzene,
1-amino-2,4-dibromo-6-N,N-diethylaminosulfonylbenzene,
1-amino-4-phenylsulfonylbenzene,
1-amino-3-chloro-4-phenylsulfonylbenzene,
1-amino-3-cyano-4-phenylsulfonylbenzene,
1-amino-2,6-dibromo-4-phenylsulfonylbenzene,
1-amino-2-phenylsulfonylbenzene,
1-amino-2,4-dibromo-6-phenylsulfonylbenzene,
1-amino-2-chloro-5-phenylsulfonylbenzene,
1-amino-2,4-di-n-butylsulfonyl-5-chlorobenzene,
1-amino-4-N,N-di-methylaminocarbonylbenzene,
1-amino-4-N,N-diethylaminocarbonylbenzene,
1-amino-4-N,N-di-n-butylaminocarbonylbenzene,
1-amino-2-bromo-4-N,N-diethylaminocarbonylbenzene,
1-amino-2,6-dibromo-4-N,N-diethylaminocarbonylbenzene,
1-amino-2-chloro-5-N,N-diethylaminocarbonylbenzene,
1-amino-2-chloro-5-N,N-di-n-butylaminocarbonylbenzene,
1-amino-2-N,N-diethylaminocarbonylbenzene,
1-amino-2,4-dibromo-6-N,N-diethylaminocarbonylbenzene,
4-amino-N-cyclohexylphthalimide,
amino-N-cyclohexylphthalimide (mixture of isomers),
4-aminobenzophenone,
4-amino-4'-isopropylbenzophenone,
2-aminobenzophenone,
2-amino-3,5-dibromobenzophenone,
3-amino-3-chloro-2'-carboxybenzophenone,
1-amino-4-phenylaminocarbonylbenzene,
1-amino-3-chloro-4-cyanobenzene,
1-amino-2,5-dicyanobenzene,
1-amino-2,4-dicyanobenzene,
1-amino-3,4-dicyanbenzene,
1-amino-3,4-dicyanobromobenzene,
1-amino-3-cyanobenzene,
1-amino-3-trifluoromethylbenzene,
1-amino-2-trifluoromethylbenzene,
1-amino-2-trifluoromethyl-4-chlorobenzene,
1-amino-2-chloro-5-trifluoromethylbenzene,
1-aminoanthraquinone,
1-amino-2,5-dichlorobenzene,
1-amino-2,4-dichlorobenzene,
1-amino-3,4-dichlorobenzene,
1-amino-2,3-dichlorobenzene,
1-amino-3-phenylsulfonylaminosulfonylbenzene,
4-amino-3,5-dibromoazobenzene,
2-aminobenzthiazole,
2-amino-6-methylsulfonylbenzthiazole,
2-amino-4-chlorobenzthiazole,
2-amino-5,6-dichlorobenzthiazole,
2-amino-6,7-dichlorobenzthiazole,
2-amino-6-bromobenzthiazole, 3-amino-2,1-benzisothiazole,
3-amino-5,7-dibromo-2,1-benzisothiazole,
3-amino-5-nitro-2,1-benzisothiazole,
3-amino-5-nitro-7-bromo-2,1-benzisothiazole,
6-amino-2-ethylsulfonylbenzthiazole,
2-amino-5-phenyl-1,3,4-thiadiazole,
2-amino-5-ethylthio-1,3,4-thiadiazole,
2-amino-5-n-butylthio-1,3,4-thiadiazole,
2-amino-5-benzylthio-1,3,4-thiadiazole,
5-amino-3-phenyl-1,2,4-thiadiazole,
dehydrothio-p-toluidine,
amino-N-phenylphthalhydrazide,
2-amino-4,6-dibromobenzthiazole,
1-amino-2-chloro-4-N,N-diethylaminosulfonylbenzene,
1-amino-2-bromo-4-N,N-di-n-butylaminosulfonylbenzene,
1-amino-4-$\beta$-hydroxethylsulfonylbenzene,
1-amino-2-bromo-4-$\beta$-hydroxyethylsulfonylbenzene,
1-amino-3-$\beta$-hydroxyethylsulfonylbenzene,
1-amino-2,4-di-$\beta$-hydroxyethylsulfonyl-5-chlorobenzene,
1-amino-2,4-di-$\beta$-hydroxyethylsulfonylbenzene,
1-amino-3-$\beta$-sulfatoethylsulfonylbenzene,
1-amino-4-$\beta$-sulfatoethylsulfonylbenzene,
1-amino-2-bromo-4-$\beta$-sulfatoethylsulfonylbenzene,
1-amino-2,4-di-$\beta$-sulfatoethylsulfonyl-5-chlorobenzene,
1-amino-2,4-di-$\beta$-sulfatoethylsulfonylbenzene,
2-amino-4-sulfo-4'-methyldiphenylsulfone,
dehydrothio-p-toluidinesulfonic acid,
1-amino-4-$\beta$-sulfatoethylaminosulfonylbenzene,
1-amino-2-bromo-4-$\beta$-sulfatoethylaminosulfonylbenzene,
1-amino-4-(N,N-di-$\beta$-sulfatoethyl)aminosulfonylbenzene,
1-amino-2-bromo-4-(N,N-di-$\beta$-sulfatoethyl)aminosulfonylbenzene,
1-amino-2,5-dichloro-4-$\beta$-sulfatoethylaminosulfonylbenzene,
1-amino-2,5-dichloro-4-(N-methyl-N-$\beta$-sulfatoethyl)aminosulfonylbenzene,
1-amino-2,5-dichloro-4-(N,N-di-$\beta$-sulfatoethyl)aminosulfonylbenzene,
1-amino-2,5-dichloro-4-$\beta$-sulfoethylaminosulfonylbenzene,
1-amino-2-chlorobenzene-4-sulfonic acid,
1-amino-2,5-dichlorobenzene-4-sulfonic acid,
1-amino-2-chlorobenzene-5-sulfonic acid,
1-amino-2,6-dibromobenzene-4-sulfonic acid,
1-aminobenzene-3-sulfonic acid,
1-aminobenzene-4-sulfonic acid,
1-aminobenzene-2-sulfonic acid,
1-aminobenzene-2,4-disulfonic acid,
1-amino-4-$\beta$-sulfatoethylsulfonylbenzene-2-sulfonic acid,
1-amino-4-(6'-methyl-7'-sulfobenzthiazolyl-2)benzene-2-sulfonic acid,
4-aminoazobenzene-3,4'-disulfonic acid,
2-amino-4'-methyldiphenylsulfone-4-sulfonic acid,
1-amino-2-(N,N-di-$\beta$-sulfatoethyl)aminosulfonylbenzene,
1-amino-2-(N-methyl-N-$\beta$-sulfatoethyl)aminosulfonylbenzene,
1-amino-2,4-dibromo-6-(N,N-di-$\beta$-sulfatoethyl)aminosulfonylbenzene,
1-amino-2-chloro-5-$\beta$-sulfatoethylaminosulfonylbenzene,
1-amino-2-chloro-5-(N,N-di-$\beta$-sulfatoethyl)aminosulfonylbenzene,
1-amino-4-$\beta$-sulfatoethylaminocarbonylbenzene,
1-amino-2-bromo-4-$\beta$-sulfatoethylaminocarbonylbenzene,
1-amino-2,6-dibromo-4-$\beta$-sulfatoethylaminocarbonylbenzene,
1-amino-4-(N-methy-N-$\beta$-sulfatoethyl)aminocarbonylbenzene,
1-amino-2-bromo-4-(N-methyl-N-$\beta$-sulfatoethyl)aminocarbonylbenzene,
1-amino-4-(N-phenyl-N-$\beta$-sulfatoethyl)aminocarbonylbenzene,
1-amino-4-(N,N-di-$\beta$-sulfatoethyl)aminocarbonylbenzene,
1-amino-2-bromo-4-(N,N-di-$\beta$-sulfatoethyl)aminocarbonylbenzene,
1-amino-2,6-dibromo-4-(N,N-di-$\beta$-sulfatoethyl)aminocarbonylbenzene,
1-amino-2-chloro-5-$\beta$-sulfatoethylaminocarbonylbenzene,
1-amino-2-chloro-5-(N,N-di-$\beta$-sulfatoethylamino)carbonylbenzene,
1-amino-2-(N-methyl-N-$\beta$-sulfatoethylamino)carbonylbenzene,
1-amino-2-(N,N-di-$\beta$-sulfatoethylamino)carbonylbenzene,
1-amino-2,4-dibromo-6-(N,N-di-$\beta$-sulfatoethylamino)carbonylbenzene,
2-aminobenzthiazole-6-sulfonic acid,
2-amino-6-methylbenzthiazole-7-sulfonic acid,
2-amino-5-$\beta$-sulfatoethylthio-1,3,4-thiadiazole,
2-amino-5-$\gamma$-sulfopropylthio-1,3,4-thiadiazole,
2-amino-5-sulfophenyl-1,3,4-thiadiazole,
5-amino-3-sulfophenyl-1,2,4-thiadiazole,
3-amino-2,1-benzisothiazole-5,7-disulfonic acid,
1-amino-2,5-dichloro-4-(N-methyl-N-$\beta$-sulfoethylamino)sulfonylbenzene,
1-amino-2,5-dichloro-4-(N-ethyl-N-$\beta$-sulfatoethylamino)sulfonylbenzene,
1-amino-2-chloro-4-$\beta$-sulfoethylaminosulfonylbenzene,
1-amino-3-chloro-4-sulfamoylbenzene-6-sulfonic acid,
1-amino-2-chloro-4-(4'-sulfophenylamino)sulfonylbenzene,
1-amino-2,5-dichloro-4-(4'-sulfophenylamino)sulfonylbenzene,
1-amino-2,5-dichloro-4-(3'-sulfophenylamino)sulfonylbenzene,
1-amino-2,5-dichloro-4-(2'-sulfophenylamino)sulfonylbenzene,
1-amino-4-$\alpha$,$\beta$-dibromopropionylaminobenzene-2-sulfonic acid,
1-amino-3-$\alpha$,$\beta$-dibromopropionylaminobenzene-6-sulfonic acid,
4-amino-N-$\beta$-sulfatoethylphthalimide,
3-amino-N-$\beta$-sulfatoethylphthalimide,
4-amino-N-(3'-sulfo-4'-methylphenyl)phthalimide,
3-amino-N-(3'-sulfo-4'-methylphenyl)phthalimide,
4-amino-N-sulfobenzylphthalimide,
3-amino-N-sulfobenzylphthalimide.

Representative examples of coupling components of the formula (6) are:
1-N,N-dimethylamino-3-$\beta$-hydroxyethylsulfonylbenzene,
1-N,N-diethylamino-3-$\beta$-hydroxyethylsulfonylbenzene,
1-N,N-di-$\beta$-hydroxyethylamino-3-$\beta$-hydroxyethylsulfonylbenzene,
1-N,N-di-$\beta$-sulfatoethylamino-3-$\beta$-sulfatoethylsulfonylbenzene, 1-N,N-di-β-hydroxy-n-propylamino-3-β-hydroxyethyl-sulfonylbenzene,
1-N,N-di-β-hydroxy-n-butylamino-3-β-hydroxyethyl-sulfonylbenzene,
1-N,N-di-β-sulfato-n-propylamino-3-β-sulfatoethylsulfonylbenzene,
1-N,N-di-β-sulfato-n-butylamino-3-β-sulfatoethylsulfonylbenzene,
1-N,N-di-γ-sulfopropylamino-3-β-sulfatoethylsulfonylbenzene,
1-N,N-di-β-sulfoethylamino-3-β-sulfatoethylsulfonylbenzene,
1-N,N-di-2-propenylamino-3-β-sulfatoethylsulfonylbenzene,
1-N,N-di-β-chloro-2-propenylamino-3-β-sulfatoethylsulfonylbenzene,
1-N,N-di-β-bromo-2-propenylamino-3-β-sulfatoethylsulfonylbenzene,
1-N,N-di-γ-chloro-2-propenylamino-3-β-sulfatoethylsulfonylbenzene,
1-N,N-di-γ-chloro-2-butenylamino-3-β-sulfatoethylsulfonylbenzene,
1-N,N-diethylamino-3-β-sulfatoethylsulfonylbenzene,
1-N,N-di-n-propylamino-3-β-sulfatoethylsulfonylbenzene,
1-N,N-di-n-butylamino-3-β-sulfatoethylsulfonylbenzene,
1-N,N-di-β-sulfato-γ-chloro-propylamino-3-β-sulfatoethylsulfonylbenzene.

A preferred embodiment of the process for the preparation of reactive dyes of the formula (1) comprises diazotising a diazo component of the formula (5) and coupling the diazonium compound to a coupling component of the formula

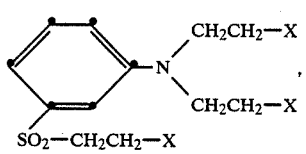

(11)

wherein X is hydroxy or sulfato, and optionally sulfating the resultant azo dye.

An advantageous method comprises preparing first a dye which contains a precursor of the reactive radical and subsequently converting it into the desired reactive radical, e.g. by esterification or by an addition reaction.

For example, it is possible to prepare a dye of the formula (1), wherein Y is a —CH$_2$CH$_2$—OH radical, and to react the intermediate with sulfuric acid, so that the hydroxy group is converted into the sulfato group; or it is possible to prepare a dye of the formula (1), wherein Y is a —CH=CH$_2$ radical, and to form a —CH$_2$CH$_2$—SSO$_3$H radical by addition of thiosulfuric acid to the intermediate.

The above described synthesis route via an intermediate stage of the reactive radical proceeds in many cases uniformly and completely.

The preferred reactive dyes of the formula (2) can be prepared readily and in good yield by diazotising a diazo component of the formula (5) and coupling the diazonium compound to a coupling component of the formula

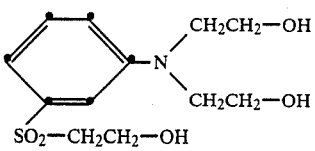

(7)

and converting the resultant monoazo compound into the trisulfato ester by reaction with chlorosulfonic acid in N-methylpyrrolidone.

The direct route, viz. coupling the already sulfated diazo component with the also sulfated coupling component, is also possible.

The reactive dyes of the formula (1) are suitable for dyeing and printing a very wide variety of materials, such as silk, leather, wool, polyamide fibres and polyurethanes, and especially cellulosic materials of fibrous structure such as linen, cellulose, regenerated cellulose and, in particular, cotton. They are suitable both for the exhaust process and for the pad-dyeing process, in which the goods are impregnated with aqueous and, if appropriate, also with salt-containing dye solutions, and the dyes are fixed after treatment with alkali or in the presence of alkali, with or without the application of heat.

The reactive dyes of the formula (1) are distinguished by high reactivity and good fixation. They can therefore be used for the exhaust process at low dyeing temperatures and need only be steamed briefly in the pad-steam process. The reactive dyes of the formula (1) produce dyeings of good wet- and light-fastness properties and of excellent tinctorial strength and remarkably good fibre-dye bond stability, both in acid and in alkaline medium. They are also distinguished by the ease with which non-fixed dye can be washed off.

The reactive dyes of the formula (1) are particularly suitable for dyeing cotton by the exhaust process, the difference between degree of exhaustion and degree of fixation being remarkably small, i.e. the soap loss is insignificant. They are also particularly suitable for the cold pad batch process, in which the dye, together with the alkali, is applied to the pad and subsequently fixed by storing the dyed goods for several hours at room temperature.

The reactive dyes of the formula (1) are also suitable for printing, in particular on cotton, and also for printing nitrogen-containing fibres, for example wool, silk or blends containing wool.

It is advisable to rinse the dyeings and prints thoroughly with cold and hot water, if appropriate with the addition of an agent which acts as a dispersant and promotes the diffusion of non-fixed dye.

The preparation of the intermediates is not described in all of the following Preparatory Examples but may be readily inferred from what has been stated above.

In the following Examples parts and percentages are by weight.

EXAMPLE 1

Ethylene oxide is introduced at a temperature of 40° C. into a suspension of 40.2 g of 3-aminophenyloxaethylsulfone in 80 ml of acetic acid until the amino group is completely alkylated (confirmation by thin-layer chromatography). A solution containing the compound of the formula

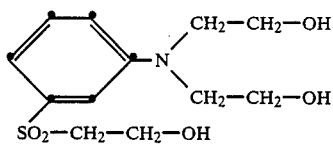

is obtained. The concentration of acetic acid is adjusted to 80% by addition of water. This solution can be used direct for coupling reactions. The above compound can be isolated by evaporating the original solution in acetic acid in vacuo at low temperature.

EXAMPLE 2

30 ml of chlorosulfonic acid is added dropwise at a temperature of 20°-40° C. to a solution of 28.9 g of the compound of the formula

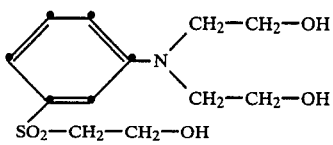

in 150 ml of N-methylpyrrolidone and the mixture is then stirred for 4 hours at 40°-42° C. The mixture is then poured into 600 ml of ice-water and the pH is adjusted to 5.5 by addition of sodium bicarbonate. The N-methylpyrrolidone is extracted with methylene chloride and the solution is then evaporated to dryness in vacuo at a bath temperature of 40° C. The product so obtained contains, in addition to sodium chloride, the compound of the formula

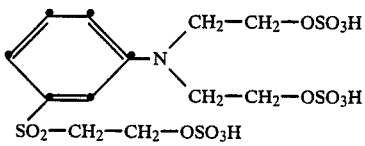

in the form of the sodium salt, which can be used as coupling component.

EXAMPLE 3

To a mixture consisting of 3.90 g of 2,4,5-trichloroaniline and 20 ml of a mixture of 5 parts of acetic and 1 part of propionic acid are added 2/100 moles of nitrosylsulfuric acid at a temperature of 0°-5° C. The mixture is stirred for 2 hours at 0°-5° C. and then 0.4 g of urea is added. After excess nitrite has been destroyed, the resultant solution is added dropwise at 0°-5° C. to 22 ml of a solution of 0.021 mole of the coupling component of the formula

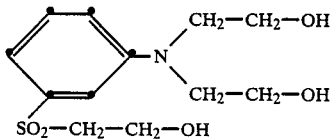

in 80% acetic acid. The pH is adjusted to 1 by addition of 30% ammonium acetate solution and then to pH 2-3 after 1 hour. After complete reaction of the diazo component, the pH is adjusted to 7 with concentrated sodium hydroxide solution and the precipitated coupling product is isolated by filtration. The filter cake is dried in vacuo at 70° C. to give the product of the formula

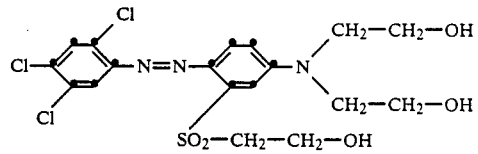

in the form of a red powder.

EXAMPLE 4

7.2 ml of chlorosulfonic acid are added dropwise at a temperature of 20°-40° C. to a solution of 9 g of the compound of the formula

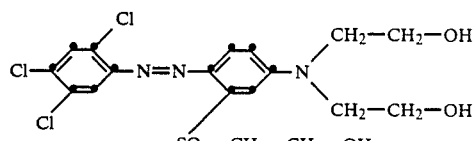

in 35 ml of N-methylpyrrolidone, and the resultant mixture is stirred for 4 hours at 40°-42° C. The mixture is then poured into ice-water and the pH is adjusted to 5.5 by addition of sodium bicarbonate. The methylpyrrolidone is extracted with methylene chloride and the dye solution is evaporated to dryness in vacuo at a bath temperature of 40° C., affording a dye preparation in the form of a red powder which, in addition to sodium chloride, contains the sodium salt of the dye of the formula

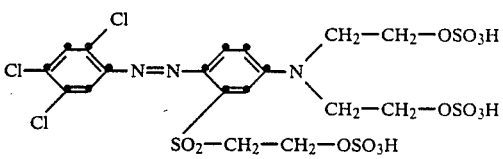

and dissolves in water to form a red solution.

When cotton is dyed with this dye by the application methods ordinarily employed for vinylsulfone dyes, there are obtained orange dyeings of good wetfastness properties and good lightfastness.

A dye which is identical with the above indicated dye is obtained by using in the coupling reaction an equivalent amount of the coupling component of the formula

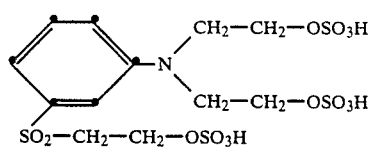

in the form of the sodium salt instead of the coupling component employed in this Example.

By using equivalent amounts of another amine as diazo component instead of 2,4,5-trichloroaniline and otherwise carrying out the same procedure, the dyes listed in Table I which have comparably good fastness properties are obtained.

TABLE I $$K = \begin{array}{c} \phantom{XX} \\ \text{—} \end{array} \begin{array}{c} \text{benzene ring with} \\ \text{N(CH}_2\text{—CH}_2\text{—OSO}_3\text{H)}_2 \\ \text{and SO}_2\text{—CH}_2\text{—CH}_2\text{—OSO}_3\text{H} \end{array}$$

| No. | Structure | Shade on cotton |
|---|---|---|
| 1 | H₃C—O₂S—C₆H₄—N=N—K | yellow |
| 2 | H₅C₂—O₂S—C₆H₄—N=N—K | yellow |
| 3 | H₃C—O₂S—C₆H₃(Cl)—N=N—K | orange |
| 4 | H₃C—O₂S—C₆H₃(Br)—N=N—K | orange |
| 5 | H₅C₂—O₂S—C₆H₃(Cl)—N=N—K | orange |
| 6 | H₅C₂—O₂S—C₆H₃(Br)—N=N—K | orange |
| 7 | H₃C—O₂S—C₆H₂(Br)(Br)—N=N—K | orange |
| 8 | H₅C₂—O₂S—C₆H₂(Br)(Br)—N=N—K | orange |
| 9 | (H₃C)₂N—O₂S—C₆H₄—N=N—K | yellow |
| 10 | (H₅C₂)₂N—O₂S—C₆H₄—N=N—K | yellow |

TABLE I-continued $$K = \underset{SO_2-CH_2-CH_2-OSO_3H}{\overset{CH_2-CH_2-OSO_3H}{\underset{CH_2-CH_2-OSO_3H}{\text{—}\langle\text{—}\rangle\text{—N}}}}$$

| No. | Structure | Shade on cotton |
|---|---|---|
| 11 | n-C₄H₉\N—O₂S—⟨⟩—N=N—K, n-C₄H₉ | yellow |
| 12 | H₃C\N—O₂S—⟨Br⟩—N=N—K, H₃C | orange |
| 13 | H₅C₂\N—O₂S—⟨Br⟩—N=N—K, H₅C₂ | orange |
| 14 | H₃C\N—O₂S—⟨Cl,Cl⟩—N=N—K, H₃C | scarlet |
| 15 | H₅C₂\N—O₂S—⟨Cl,Cl⟩—N=N—K, H₅C₂ | scarlet |
| 16 | n-C₄H₉\N—O₂S—⟨Cl,Cl⟩—N=N—K, n-C₄H₉ | scarlet |
| 17 | H₅C₂—NHO₂S—⟨Cl,Cl⟩—N=N—K | scarlet |
| 18 | H₉C₄—CH(C₂H₅)—CH₂—NHO₂S—⟨Cl,Cl⟩—N=N—K | scarlet |
| 19 | ⟨cyclohexyl⟩—NHO₂S—⟨Cl,Cl⟩—N=N—K | scarlet |

TABLE I-continued
$$K = \underset{SO_2-CH_2-CH_2-OSO_3H}{\underset{|}{\text{phenyl}}}-N\underset{CH_2-CH_2-OSO_3H}{\overset{CH_2-CH_2-OSO_3H}{<}}$$
| No. | Structure | Shade on cotton |
|---|---|---|
| 20 | 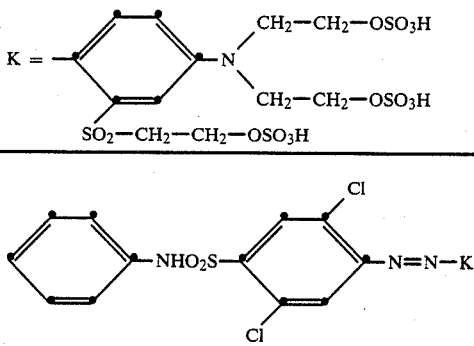 | scarlet |
| 21 | 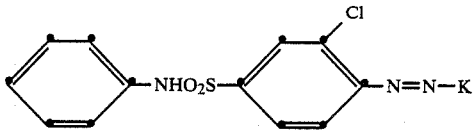 | orange |
| 22 | 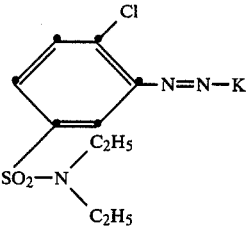 | yellow |
| 23 | 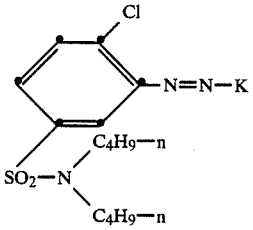 | yellow |
| 24 | 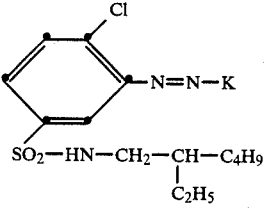 | yellow |
| 25 | 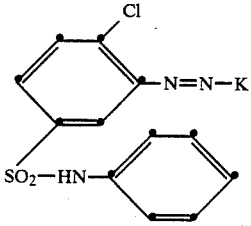 | yellow |

TABLE I-continued $$K = \underset{SO_2-CH_2-CH_2-OSO_3H}{\overset{CH_2-CH_2-OSO_3H}{\underset{CH_2-CH_2-OSO_3H}{\text{—}\langle\text{—}\rangle\text{—N}}}}$$

| No. | | Shade on cotton |
|---|---|---|
| 26 | (Cl, SO₂NH-, COOH substituted phenyl)—N=N—K | yellow |
| 27 | (SO₂NH-phenyl substituted phenyl)—N=N—K | yellow |
| 28 | (Cl, SO₂CH₃ substituted phenyl)—N=N—K | yellow |
| 29 | (Cl, SO₂—C₂H₅ substituted phenyl)—N=N—K | yellow |
| 30 | H₅C₂—HNO₂S—(Br, Br substituted phenyl)—N=N—K | orange |
| 31 | n-C₄H₉—NHO₂S—(Br, Br substituted phenyl)—N=N—K | orange |
| 32 | (H₃C)₂N—O₂S—(Br, Br substituted phenyl)—N=N—K | orange |

TABLE I-continued $$K = \underset{SO_2-CH_2-CH_2-OSO_3H}{\overset{CH_2-CH_2-OSO_3H}{\underset{CH_2-CH_2-OSO_3H}{\diagup}}}\!\!\!\!\!\!\!\!\!\!\!\!\!\!\!\!\!\!\!\!\!\!\!\!\!\!$$

| No. | Structure | Shade on cotton |
|-----|-----------|-----------------|
| 33 | (H$_5$C$_2$)$_2$N—O$_2$S—[2,5-dibromophenyl]—N=N—K | orange |
| 34 | [2-(N,N-diethylsulfamoyl)phenyl]—N=N—K | yellow |
| 35 | [2-(N,N-di-n-butylsulfamoyl)phenyl]—N=N—K | yellow |
| 36 | [2-(N-cyclohexyl-N-methylsulfamoyl)phenyl]—N=N—K | yellow |
| 37 | [2-((2-chlorophenoxy)sulfonyl)phenyl]—N=N—K | yellow |
| 38 | [2-(N,N-diethylsulfamoyl)-4,5-dibromophenyl]—N=N—K | orange |
| 39 | phenyl—SO$_2$—[4-phenyl]—N=N—K | yellow |

TABLE I-continued $$K = \underset{SO_2-CH_2-CH_2-OSO_3H}{\underset{|}{\bigcirc}}-N\underset{CH_2-CH_2-OSO_3H}{\overset{CH_2-CH_2-OSO_3H}{\diagdown}}$$

| No. | Structure | Shade on cotton |
|---|---|---|
| 40 | Phenyl–SO$_2$–(3-Cl-phenyl)–N=N–K | orange |
| 41 | Phenyl–SO$_2$–(3-CN-phenyl)–N=N–K | orange |
| 42 | Phenyl–SO$_2$–(3,5-diBr-phenyl)–N=N–K | orange |
| 43 | 2-(phenylsulfonyl)phenyl–N=N–K | yellow |
| 44 | (3,5-dibromo-2-(phenylsulfonyl)phenyl)–N=N–K | orange |
| 45 | (2-Cl-5-(phenylsulfonyl)phenyl)–N=N–K | yellow |
| 46 | (2,5-bis(n-C$_4$H$_9$SO$_2$)-4-Cl-phenyl)–N=N–K | red |

TABLE I-continued $$K = \text{(benzene ring with } N(CH_2-CH_2-OSO_3H)_2 \text{ at para and } SO_2-CH_2-CH_2-OSO_3H \text{ at meta)}$$

| No. | Structure | Shade on cotton |
|---|---|---|
| 47 | (H$_3$C)$_2$N—OC—C$_6$H$_4$—N=N—K | yellow |
| 48 | (H$_5$C$_2$)$_2$N—OC—C$_6$H$_4$—N=N—K | yellow |
| 49 | (n-C$_4$H$_9$)$_2$N—OC—C$_6$H$_4$—N=N—K | yellow |
| 50 | (H$_5$C$_2$)$_2$N—OC—C$_6$H$_3$(Br)—N=N—K | orange |
| 51 | (H$_5$C$_2$)$_2$N—OC—C$_6$H$_2$(Br)$_2$—N=N—K | orange |
| 52 | 2-Cl, 5-CON(C$_2$H$_5$)$_2$-C$_6$H$_3$—N=N—K | yellow |
| 53 | 2-Cl, 5-CON(n-C$_4$H$_9$)$_2$-C$_6$H$_3$—N=N—K | yellow |
| 54 | 2-CON(C$_2$H$_5$)$_2$-C$_6$H$_4$—N=N—K | yellow |

TABLE I-continued $$K = \underset{SO_2-CH_2-CH_2-OSO_3H}{\overset{CH_2-CH_2-OSO_3H}{\underset{|}{\bigodot}-N\underset{CH_2-CH_2-OSO_3H}{\overset{|}{\diagdown}}}}$$

| No. | Structure | Shade on cotton |
|-----|-----------|-----------------|
| 55  | 2,4-dibromo-6-(N,N-diethylcarbamoyl)phenyl-N=N-K | orange |
| 56  | anthraquinone-N(H)-phenyl diazo coupled structure N=N-K | scarlet |
| 57  | anthraquinone-N(H)-phenyl diazo coupled structure N=N-K (mixture of isomers) | scarlet |
| 58  | phenyl-CO-phenyl-N=N-K | yellow |
| 59  | (CH$_3$)$_2$CH-phenyl-CO-phenyl-N=N-K | yellow |
| 60  | phenyl-CO-phenyl(2-N=N-K) | yellow |
| 61  | phenyl-CO-(4,6-dibromo)phenyl-N=N-K | orange |

TABLE I-continued $$K = \underset{SO_2-CH_2-CH_2-OSO_3H}{\overset{CH_2-CH_2-OSO_3H}{\underset{\displaystyle\bigvee}{\text{—}\bigcirc\text{—N}}}}\overset{CH_2-CH_2-OSO_3H}{\underset{CH_2-CH_2-OSO_3H}{}}$$

| No. | Structure | Shade on cotton |
|---|---|---|
| 62 | 4-Cl, 3-(2-carboxybenzoyl)-phenyl—N=N—K | yellow |
| 63 | 4-(phenylcarbamoyl)phenyl—N=N—K | yellow |
| 64 | 3-Cl, 4-CN-phenyl—N=N—K | orange |
| 65 | 2-CN, 5-CN-phenyl—N=N—K | yellow |
| 66 | 2-CN, 5-CN-phenyl—N=N—K | scarlet |
| 67 | 2-CN, 3-CN-phenyl—N=N—K | scarlet |
| 68 | 2-CN, 3-CN, 5-Br-phenyl—N=N—K | red |
| 69 | 3-CN-phenyl—N=N—K | yellow |

TABLE I-continued $$K = \underset{SO_2-CH_2-CH_2-OSO_3H}{\underset{|}{\bigcirc}} - N \underset{CH_2-CH_2-OSO_3H}{\overset{CH_2-CH_2-OSO_3H}{\diagdown}}$$

| No. | Structure | Shade on cotton |
|---|---|---|
| 70 | 3-CF₃-C₆H₄—N=N—K | yellow |
| 71 | 2-CF₃-C₆H₄—N=N—K | yellow |
| 72 | 2-CF₃-4-Cl-C₆H₃—N=N—K | yellow |
| 73 | 2-Cl-5-CF₃-C₆H₃—N=N—K | yellow |
| 74 | anthraquinon-2-yl—N=N—K | yellow |
| 75 | 2,4-Cl₂-C₆H₃—N=N—K | yellow |
| 76 | 2,5-Cl₂-C₆H₃—N=N—K | yellow |
| 77 | 2,3-Cl₂-C₆H₃—N=N—K | yellow |

TABLE I-continued $$K = \underset{SO_2-CH_2-CH_2-OSO_3H}{\underset{|}{\bigcirc}} -N\underset{CH_2-CH_2-OSO_3H}{\overset{CH_2-CH_2-OSO_3H}{<}}$$

| No. | Structure | Shade on cotton |
|-----|-----------|-----------------|
| 78 | 2,3-dichlorophenyl—N=N—K | yellow |
| 79 | 2,4,5-trichlorophenyl—N=N—K | orange |
| 80 | phenyl—SO$_2$NHO$_2$S—phenyl—N=N—K | yellow |
| 81 | phenyl—N=N—(2,5-dibromophenyl)—N=N—K | orange |
| 82 | benzothiazol-2-yl—N=N—K | red |
| 83 | 6-(H$_3$C—O$_2$S)-benzothiazol-2-yl—N=N—K | red |
| 84 | 4-chloro-benzothiazol-2-yl—N=N—K | red |
| 85 | 5,6-dichloro-benzothiazol-2-yl—N=N—K | red |

TABLE I-continued
$$K = \underset{SO_2-CH_2-CH_2-OSO_3H}{\underset{|}{\bigcirc}}-N\underset{CH_2-CH_2-OSO_3H}{\overset{CH_2-CH_2-OSO_3H}{<}}$$
| No. | | Shade on cotton |
|---|---|---|
| 86 | 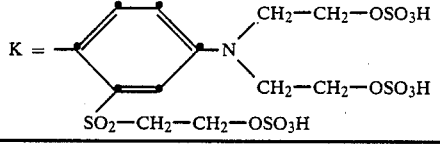 | red |
| 87 | 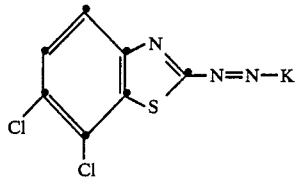 | red |
| 88 | 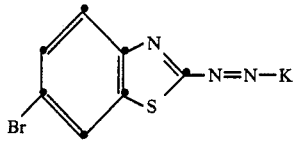 | red |
| 89 | 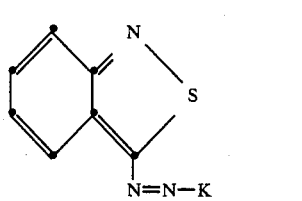 | red |
| 90 | 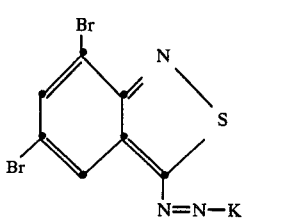 | red |
| 91 | 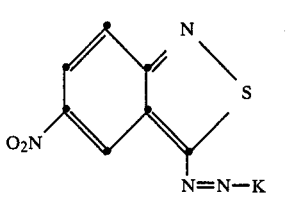 | red |
| 92 | 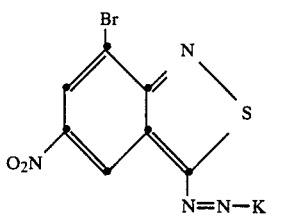 | orange |
| 93 | 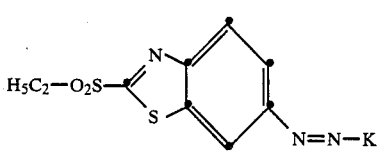 | red |

TABLE I-continued $$K = \begin{array}{c} \phantom{x} \\ \text{SO}_2-\text{CH}_2-\text{CH}_2-\text{OSO}_3\text{H} \end{array} \underset{\text{CH}_2-\text{CH}_2-\text{OSO}_3\text{H}}{\overset{\text{CH}_2-\text{CH}_2-\text{OSO}_3\text{H}}{\diagup N \diagdown}}$$

| No. | | Shade on cotton |
|---|---|---|
| 94 | H₅C₂—S—C(=N—N=)—S—C(=N)—N=N—K (thiadiazole with H₅C₂—S) | red |
| 95 | n-C₄H₉—S—C(=N—N=)—S—C(=N)—N=N—K | red |
| 96 | Ph—CH₂—S—C(=N—N=)—S—C(=N)—N=N—K | red |
| 97 | Ph-fused thiazole—N=N—K | red |
| 98 | H₃C—benzothiazol-2-yl—C₆H₄—N=N—K | yellow |
| 99 | phthalhydrazide-phenyl—N=N—K (mixture of isomers) | orange |

EXAMPLE 5

28.1 g of 3-(β-sulfatoethylsulfonyl) aniline are dissolved at room temperature in 100 ml of water, with the addition of sodium bicarbonate, to give a neutral solution. To this solution are added 17.8 g of an aqueous 40% nitrite solution and the mixture so obtained is vigorously stirred into a mixture of 80 g of ice and 27 g of 31% hydrochloric acid. After diazotisation is complete, the diazo suspension is added to a solution of 0.1 mole of the sodium salt of the coupling component of the formula

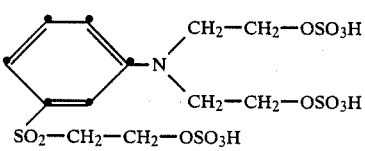

in 100 ml of water, which solution has been cooled beforehand to 0°–5° C. For coupling, the pH is adjusted to 3–4 with sodium bicarbonate. Upon completion of coupling, the pH is adjusted to 5.5 and the resultant dye is isolated by concentrating the solution in vacuo at 40° C., affording the sodium salt of the dye of the formula

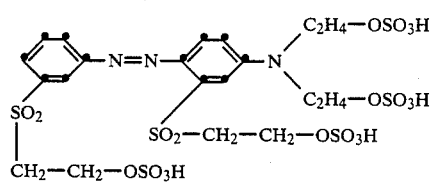

in the form of a yellow powder which still contains sodium chloride.

Application of this dye to cotton fabrics by the dyeing methods ordinarily employed for vinylsulfone dyes gives reddish yellow dyeings of good lightfastness and good wetfastness properties.

By using equivalent amounts of other amines which contain sulfo groups instead of the diazo component employed in this Example and otherwise carrying out the same procedure, the dyes listed in Table II which have comparably good fastness properties when applied to cotton are obtained.

TABLE II

| No. | K = [structure with N(CH₂-CH₂-OSO₃H)₂ and SO₂-CH₂-CH₂-OSO₃H] | Shade on cotton |
|---|---|---|
| 1 | HO₃S—O—C₂H₄—O₂S—[phenyl]—N=N—K | yellow |
| 2 | HO₃S—O—C₂H₄—O₂S—[phenyl-Br]—N=N—K | orange |
| 3 | HO₃S—O—C₂H₄—O₂S—[phenyl with SO₂-C₂H₄-OSO₃H, Cl]—N=N—K | red |
| 4 | HO₃S—O—C₂H₄—O₂S—[phenyl with SO₂-C₂H₄-OSO₃H]—N=N—K | red |
| 5 | [phenyl-CH₃-SO₂-phenyl(SO₃H)]—N=N—K | orange |
| 6 | [benzothiazole with H₃C, SO₃H]—[phenyl]—N=N—K | yellow |

EXAMPLE 6

28 g of propylene oxide are added dropwise at a temperature of 40° C. to a suspension of 40.2 g of 3-aminophenyloxaethylsulfone in 80 ml of acetic acid. The mixture is then stirred until alkylation of the amino group is complete (confirmation by thin-layer chromatography). The reaction mixture is then diluted with water to an acetic acid concentration of 80% to give a solution which contains the coupling component of the formula

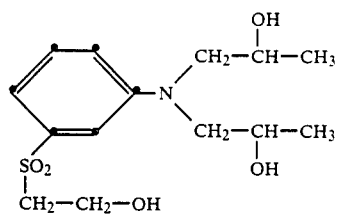

This solution can be used direct for coupling reactions.

By using an equivalent amount of butylene oxide instead of propylene oxide and otherwise carrying out the above procedure, the coupling component of the formula

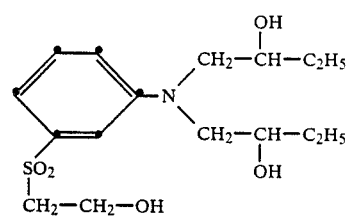

is obtained as solution in 80% acetic acid.

Both compounds can be converted into the sulfato esters in the manner described in Example 2.

The use of these coupling components in accordance with the procedure described in Example 5 gives the dyes listed in Table III, which produce light- and wet-fast dyeings when they are applied to cotton by the dyeing methods conventionally employed for vinylsulfone dyes.

TABLE III

| No. | K = [phenyl-N(CH₂-CH(OSO₃H)-CH₃)₂ with SO₂-CH₂-CH₂-OSO₃H] | Shade on cotton |
|---|---|---|
| 1 | H₅C₂—O₂S—[phenyl]—N=N—K | yellow |
| 2 | H₃C—O₂S—[phenyl-Cl]—N=N—K | orange |
| 3 | H₃C—O₂S—[phenyl-Br]—N=N—K | orange |
| 4 | (H₅C₂)₂N—O₂S—[phenyl]—N=N—K | yellow |
| 5 | (H₅C₂)₂N—O₂S—[phenyl-Br]—N=N—K | orange |

TABLE III-continued

| No. | Structure | Shade on cotton |
|---|---|---|
| 6 | H₅C₂—NHO₂S—(2,5-diCl-phenyl)—N=N—K | scarlet |
| 7 | (H₅C₂)₂N—O₂S—(2,5-diCl-phenyl)—N=N—K | scarlet |
| 8 | phenyl-SO₂-(phenyl)-N=N—K (ortho) | yellow |
| 9 | (2-Cl, 4-CF₃-phenyl)—N=N—K | yellow |
| 10 | phenyl-NHOC-(phenyl)-N=N—K | yellow |
| 11 | (2,4,5-triCl-phenyl)—N=N—K | orange |
| 12 | H₃C—O₂S—(phenyl)—N=N—K | yellow |
| 13 | H₃C—O₂S—(2-Cl-phenyl)—N=N—K | orange |
| 14 | H₃C—O₂S—(2-Br-phenyl)—N=N—K | orange |
| 15 | (H₅C₂)₂NO₂S—(phenyl)—N=N—K | yellow |
| 16 | (H₅C₂)₂N—O₂S—(2-Br-phenyl)—N=N—K | orange |
| 17 | H₅C₂—NHO₂S—(2,5-diCl-phenyl)—N=N—K | scarlet |
| 18 | (H₅C₂)₂N—O₂S—(2,5-diCl-phenyl)—N=N—K | scarlet |
| 19 | phenyl-SO₂-(phenyl)-N=N—K | yellow |
| 20 | (2-Cl, 4-CF₃-phenyl)—N=N—K | yellow |
| 21 | phenyl-NHOC-(phenyl)-N=N—K | yellow |
| 22 | (2,4,5-triCl-phenyl)—N=N—K | orange |

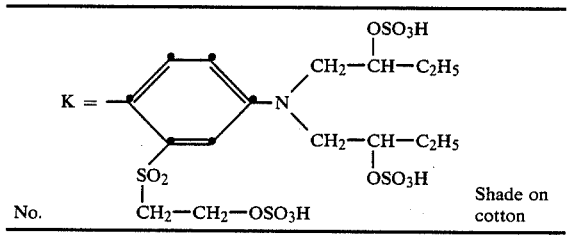

$$K = \text{structure with } -N(CH_2-CH(OSO_3H)-C_2H_5)_2, \, SO_2-CH_2-CH_2-OSO_3H$$

EXAMPLE 7

A mixture consisting of 20.1 g of 3-aminophenyloxyethylsulfone, 24.2 g of 1,3-dichloropropene, 4.4 g of magnesium oxide, 0.5 g of potassium iodide and 20 ml of ethylene glycol monoethyl ether is stirred at 98° to 100° C. until alkylation of the amino group is complete (confirmation by thin-layer chromatography). The reaction mixture is diluted with 60 ml of ethylene glycol monoethyl ether and undissolved inorganic salts are removed by filtration. The resultant solution, which contains the compound of the formula

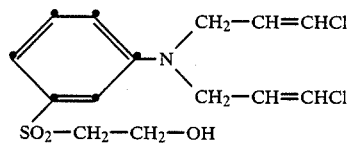

can be used direct for azo coupling reactions. After they have been isolated in known manner, the compounds can be converted into the sulfato esters.

If the above procedure is repeated using equivalent amounts of allyl bromide, 1,2-dichloropropene, 1,2-dibromopropene, 1,3-dichloro-2-butene or n-butyl bromide instead of 1,3-dichloropropene, then the coupling components of the formulae

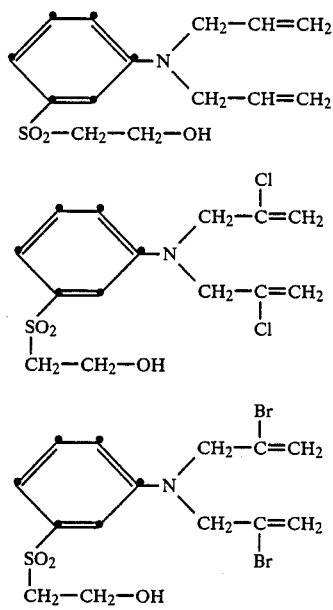

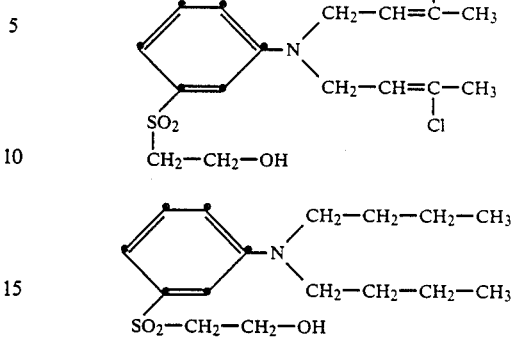

are obtained. These compounds can be converted in known manner into their sulfo esters.

Azo coupling in accordance with Example 5 gives the dyes listed in Table IV, which produce light- and wetfast dyeings when they are applied to cotton by the dyeing methods conventionally employed for vinylsulfone dyes.

TABLE IV

| No. | | Shade on cotton |
|-----|---|-----------------|
| 1 | | yellow |
| 2 | | orange |
| 3 | | orange |
| 4 | | scarlet |
| 5 | | scarlet |

TABLE IV-continued

| No. | Structure | Shade on cotton |
|---|---|---|
| 6 | HO₃S—O—C₂H₄\N-O₂S—[2,5-Cl₂-C₆H₂]—N=N—K with HO₃S—O—C₂H₄ | scarlet |
| 7 | HO₃S—[2,5-Cl₂-C₆H₂]—N=N—K | orange |
| 8 | HO₃S—[3-Cl-C₆H₃]—N=N—K | yellow |

$$K = -\underset{SO_2-CH_2-CH_2-OSO_3H}{\underbrace{C_6H_3}}-N\begin{pmatrix}CH_2-CH=CHCl\\CH_2-CH=CHCl\end{pmatrix}$$

| No. | Structure | Shade on cotton |
|---|---|---|
| 9 | HO₃S—O—C₂H₄—NHO₂S—[C₆H₄]—N=N—K | yellow |
| 10 | HO₃S—O—C₂H₄—NHO₂S—[3-Br-C₆H₃]—N=N—K | orange |
| 11 | (HO₃S—O—C₂H₄)₂N-O₂S—[3-Br-C₆H₃]—N=N—K | orange |
| 12 | HO₃S—O—C₂H₄—NHO₂S—[2,5-Cl₂-C₆H₂]—N=N—K | scarlet |
| 13 | (HO₃S—O—C₂H₄)₂N-O₂S—[2,5-Cl₂-C₆H₂]—N=N—K | scarlet |
| 14 | HO₃S—[2,5-Cl₂-C₆H₂]—N=N—K | orange |

TABLE IV-continued

| No. | Structure | Shade on cotton |
|---|---|---|
| 15 | HO₃S—⌬(Cl)—N=N—K | yellow |
| 16 | (Cl)⌬(SO₃H)—N=N—K | yellow |
| 17 | HO₃S—O—C₂H₄—S—C(=N—N=)C(S)—N=N—K (thiadiazole) | red |
| 18 | HO₃S—⌬—C(=N—)C(N(S))—N=N—K (thiadiazole with phenyl) | red |

$$K = -\phantom{x}\underset{\underset{CH_2-CH_2-OSO_3H}{SO_2}}{\bigcirc}-N\begin{cases}CH_2-C(Cl)=CH_2\\CH_2-C(Cl)=CH_2\end{cases}$$

| No. | Structure | Shade on cotton |
|---|---|---|
| 19 | HO₃S—O—C₂H₄—NHO₂S—⌬—N=N—K | yellow |
| 20 | HO₃S—O—C₂H₄—NHO₂S—⌬(Br)—N=N—K | orange |
| 21 | (HO₃S—O—C₂H₄)₂N—O₂S—⌬(Br)—N=N—K | orange |
| 22 | HO₃S—O—C₂H₄—NHO₂S—⌬(Cl,Cl)—N=N—K | scarlet |
| 23 | (HO₃S—O—C₂H₄)₂N—O₂S—⌬(Cl,Cl)—N=N—K | scarlet |

TABLE IV-continued
| 24 | 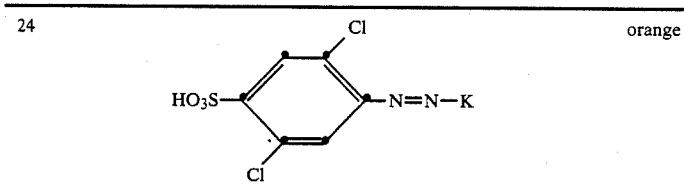 | orange |
| 25 | 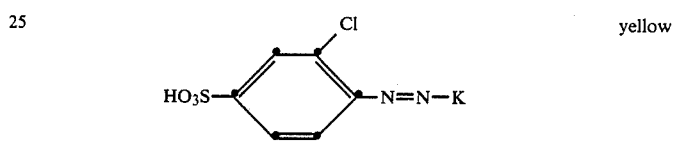 | yellow |
| 26 | 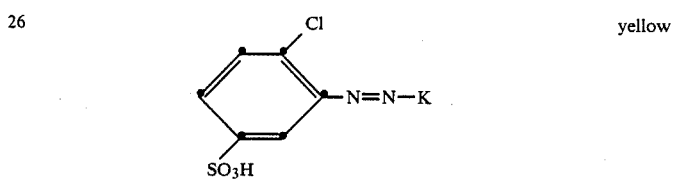 | yellow |
| 27 | 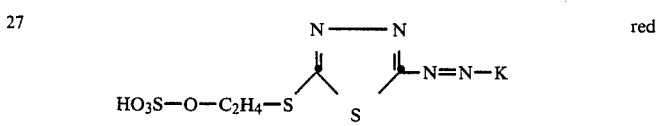 | red |
| 28 | 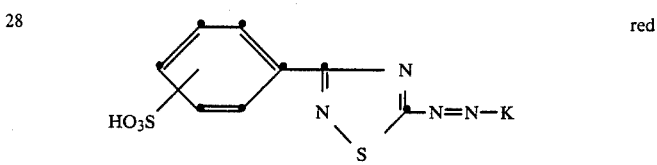 | red |
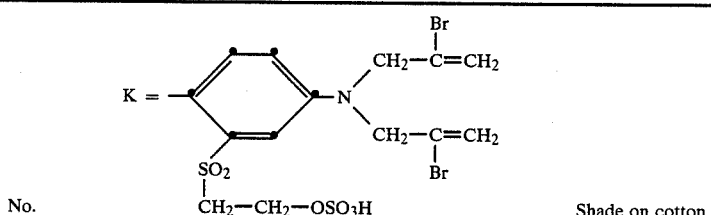
| No. | | Shade on cotton |
| 29 | 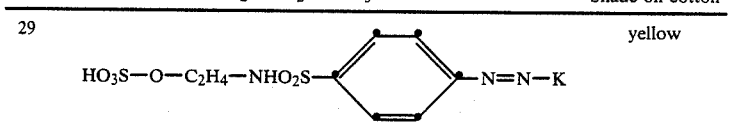 | yellow |
| 30 | 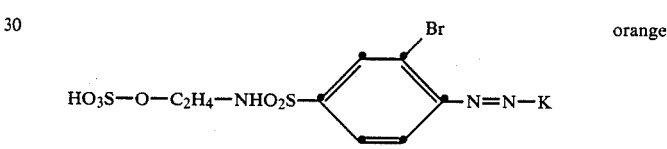 | orange |
| 31 | 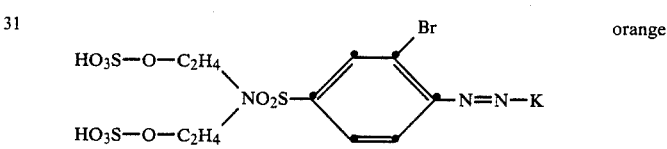 | orange |
| 32 | 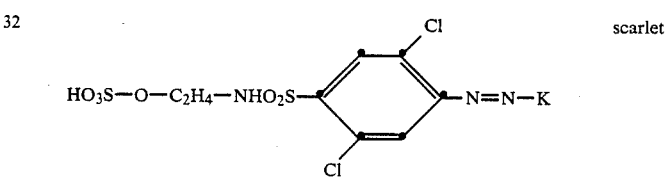 | scarlet |

TABLE IV-continued
| 33 | 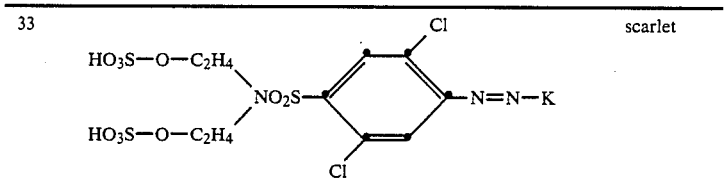 | scarlet |
| --- | --- | --- |
| 34 | 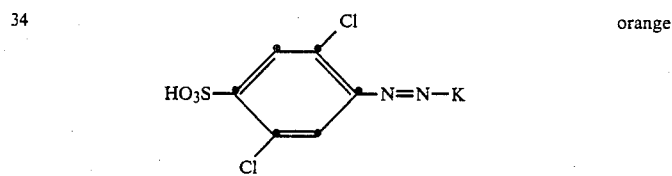 | orange |
| 35 | 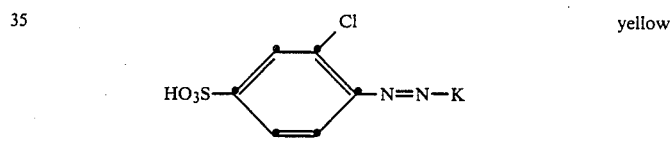 | yellow |
| 36 | 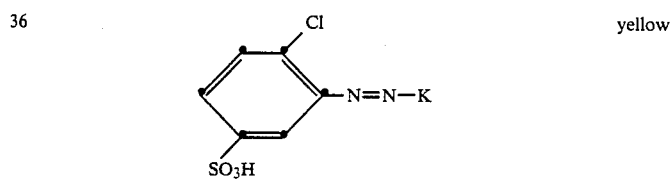 | yellow |
| 37 | 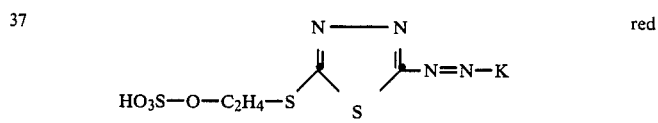 | red |
| 38 | 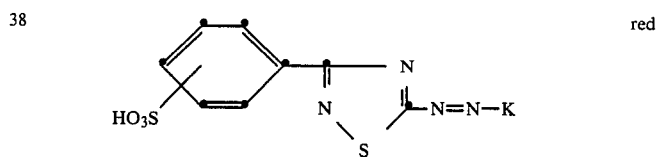 | red |
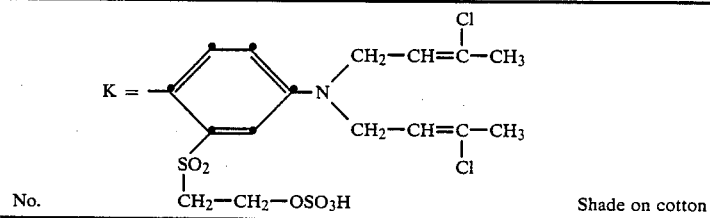
| No. |  | Shade on cotton |
| --- | --- | --- |
| 39 | 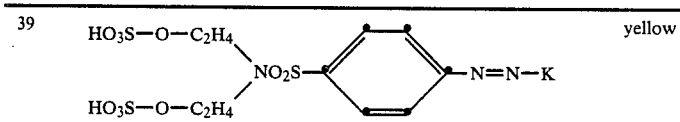 | yellow |
| 40 | 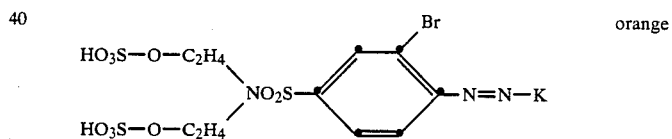 | orange |
| 41 | 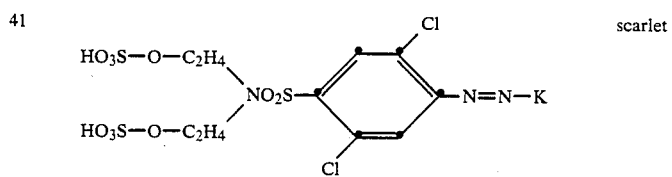 | scarlet |

TABLE IV-continued

| No. | Structure | Shade on cotton |
|---|---|---|
| 42 | 4-HO3S, 2-SO3H-C6H3-N=N-K | yellow |
| 43 | 3-HO3S, 5-SO3H-phenyl with 2-thiazolyl and C(CH3)=N-N-K substituents | red |

K = -C6H4-N(CH2-CH2-CH2-CH3)2 (para to attachment)

| No. | Structure | Shade on cotton |
|---|---|---|
| 44 | HO3S-O-C2H4-NHO2S-C6H4-N=N-K | yellow |
| 45 | (HO3S-O-C2H4)2N-O2S-C6H4-N=N-K | yellow |
| 46 | (HO3S-O-C2H4)2N-O2S-C6H3(Br)-N=N-K | orange |
| 47 | (HO3S-O-C2H4)2N-O2S-C6H2(Cl)(Cl)-N=N-K | scarlet |
| 48 | HO3S-O-C2H4-O2S-C6H3(SO3H)-N=N-K | yellow |
| 49 | 6-methyl-7-sulfo-benzothiazol-2-yl-C6H3(SO3H)-N=N-K | yellow |
| 50 | HO3S-C6H4-N=N-C6H3(SO3H)-N=N-K | orange |

TABLE IV-continued

| 51 | 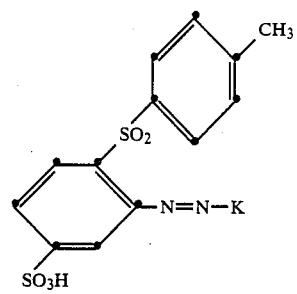 | yellow |

EXAMPLE 8

A mixture of 20.1 g of 3-aminophenyloxaethylsulfone, 29 g of propane sultone and 50 ml of dimethylformamide is stirred at a temperature of 70°–72° C. until alkylation of the amino group is complete (confirmation by thin-layer chromatography), to give a solution which contains the compound of the formula

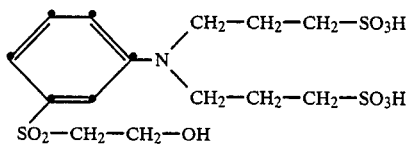

and which can be used direct for azo coupling reactions. The dyes thereby obtained can be converted in known manner into their sulfo esters.

Reaction of 3-aminophenyloxaethylsulfone with 2-bromoethanesulfonic acid in ethylene glycol monomethyl ether in the presence of magnesium oxide, at a temperature of 100° C., gives a solution of the compound of the formula

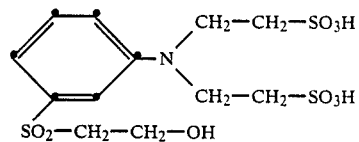

which can be used in the same manner for azo coupling reactions. Dyes obtainable with these coupling components are listed in Table V. The dyeings obtained with these dyes on cotton by the dyeing methods conventionally employed for vinylsulfone dyes have good light- and wetfastness properties.

TABLE V $$K = \text{phenyl-N}(CH_2-CH_2-CH_2-SO_2H)(CH_2-CH_2-CH_2-SO_3H)$$

| No. | $SO_2-CH_2-CH_2-OSO_3H$ | Shade on cotton |
|---|---|---|
| 1 |  H₃C—O₂S—⟨⟩—N=N—K | yellow |
| 2 | 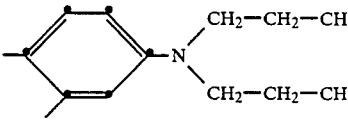 H₃C—O₂S—⟨Cl⟩—N=N—K | orange |
| 3 | 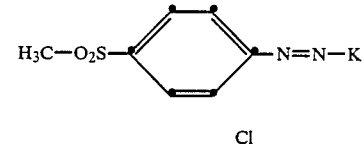 H₃C—O₂S—⟨Br⟩—N=N—K | orange |
| 4 | 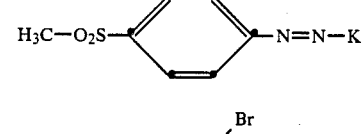 H₅C₂—O₂S—⟨⟩—N=N—K | yellow |
| 5 | 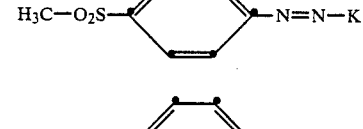 H₅C₂—O₂S—⟨Br⟩—N=N—K | orange |

TABLE V-continued $$K = -\text{C}_6\text{H}_3(\text{SO}_2-\text{CH}_2-\text{CH}_2-\text{OSO}_3\text{H})-\text{N}(\text{CH}_2-\text{CH}_2-\text{CH}_2-\text{SO}_2\text{H})(\text{CH}_2-\text{CH}_2-\text{CH}_2-\text{SO}_3\text{H})$$

| No. | Structure | Shade on cotton |
|---|---|---|
| 6 | (H$_5$C$_2$)$_2$N-O$_2$S—C$_6$H$_4$—N=N—K | yellow |
| 7 | (H$_5$C$_2$)$_2$N-O$_2$S—C$_6$H$_3$(Br)—N=N—K | orange |
| 8 | H$_5$C$_2$NHO$_2$S—C$_6$H$_2$(Cl)(Cl)—N=N—K | scarlet |
| 9 | (H$_5$C$_2$)$_2$N-O$_2$S—C$_6$H$_2$(Cl)(Cl)—N=N—K | scarlet |
| 10 | (n-C$_4$H$_9$)$_2$N-O$_2$S—C$_6$H$_2$(Cl)(Cl)—N=N—K | scarlet |
| 11 | n-C$_4$H$_9$—CH(C$_2$H$_5$)—CH$_2$—NHO$_2$S—C$_6$H$_2$(Cl)(Cl)—N=N—K | scarlet |
| 12 | H$_3$C—O$_2$S—C$_6$H$_2$(Br)(Br)—N=N—K | orange |
| 13 | H$_5$C$_2$—O$_2$S—C$_6$H$_2$(Br)(Br)—N=N—K | orange |

TABLE V-continued $$K = -\underset{SO_2-CH_2-CH_2-OSO_3H}{\underset{|}{\bigcirc}}-N\underset{CH_2-CH_2-CH_2-SO_3H}{\overset{CH_2-CH_2-CH_2-SO_2H}{\diagdown}}$$

| No. | Structure | Shade on cotton |
|---|---|---|
| 14 | (H$_5$C$_2$)$_2$NO$_2$S—[phenyl with 2,5-Br$_2$]—N=N—K | orange |
| 15 | [4-Cl, 3-(SO$_2$NH-phenyl)phenyl]—N=N—K | yellow |
| 16 | [3-(SO$_2$HN-phenyl)phenyl]—N=N—K | yellow |
| 17 | [4-Cl, 3-(SO$_2$N(C$_2$H$_5$)$_2$)phenyl]—N=N—K | yellow |
| 18 | [4-Cl, 3-(SO$_2$N(n-C$_4$H$_9$)$_2$)phenyl]—N=N—K | yellow |
| 19 | phenyl—SO$_2$—[phenyl]—N=N—K | yellow |
| 20 | [2-(phenyl-SO$_2$)phenyl]—N=N—K | yellow |

TABLE V-continued $$K = \text{[4-(N,N-bis(CH}_2\text{-CH}_2\text{-CH}_2\text{-SO}_3\text{H))-2-(SO}_2\text{-CH}_2\text{-CH}_2\text{-OSO}_3\text{H})\text{-phenyl]}$$

K = phenyl ring substituted with:
- N(CH₂—CH₂—CH₂—SO₃H)(CH₂—CH₂—CH₂—SO₃H)
- SO₂—CH₂—CH₂—OSO₃H

| No. | Diazo component | Shade on cotton |
|---|---|---|
| 21 | 2-Cl, 4-(phenylsulfonyl)phenyl—N=N—K | yellow |
| 22 | 2-Cl, 5-CF₃-phenyl—N=N—K | yellow |
| 23 | 4-Cl, 2-CF₃-phenyl—N=N—K | yellow |
| 24 | anthraquinonyl—N=N—K | orange |
| 25 | 3-CF₃-phenyl—N=N—K | yellow |
| 26 | 2,4,5-trichlorophenyl—N=N—K | orange |
| 27 | HO₃S—O—C₂H₄—O₂S—phenyl—N=N—K | yellow |
| 28 | 3-(SO₂—C₂H₄—OSO₃H)-phenyl—N=N—K | yellow |

TABLE V-continued $$K = \text{aryl with } N(CH_2CH_2CH_2SO_2H)(CH_2CH_2CH_2SO_3H) \text{ and } SO_2-CH_2-CH_2-OSO_3H$$

| No. | Structure | Shade on cotton |
|-----|-----------|-----------------|
| 29 | HO₃S—O—C₂H₄—O₂S—(phenyl with Br)—N=N—K | orange |
| 30 | HO₃S—O—C₂H₄—O₂S—(phenyl with SO₂—C₂H₄—OSO₃H and Cl)—N=N—K | red |
| 31 | HO₃S—O—C₂H₄—O₂S—(phenyl with SO₂—C₂H₄—OSO₃H)—N=N—K | red |
| 32 | 5,6-dichlorobenzothiazol-2-yl—N=N—K | red |
| 33 | 6,7-dichlorobenzothiazol-2-yl—N=N—K | red |
| 34 | 4,6-dibromobenzothiazol-2-yl—N=N—K | red |
| 35 | (H₅C₂)₂N—O₂S—(phenyl)—N=N—K | yellow |
| 36 | (n-C₄H₉)₂N—O₂S—(phenyl)—N=N—K | yellow |
| 37 | H₃C—O₂S—(phenyl with Cl)—N=N—K | orange |

TABLE V-continued
K = 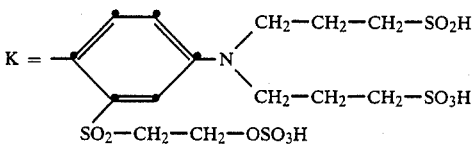
| No. | | Shade on cotton |
|---|---|---|
| 38 | 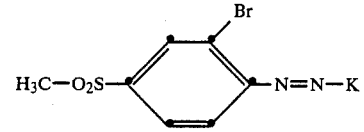 | orange |
| 39 | 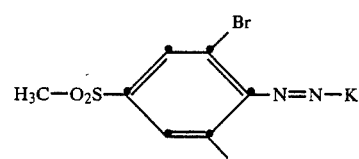 | orange |
| 40 | 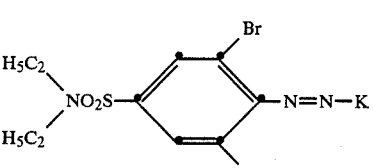 | orange |
| 41 | 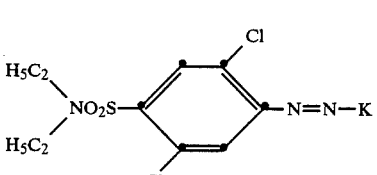 | orange |
| 42 | 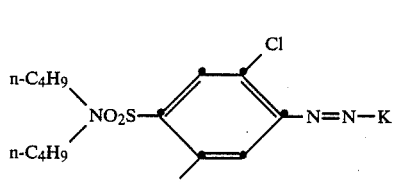 | scarlet |
| 43 | 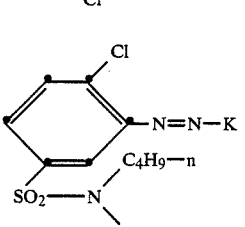 | scarlet |
| 44 | 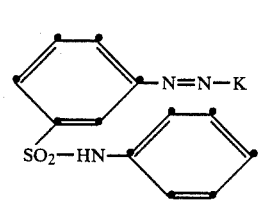 | yellow |
| 45 |  | yellow |

TABLE V-continued $$K = \begin{array}{c} \text{CH}_2\text{—CH}_2\text{—CH}_2\text{—SO}_2\text{H} \\ \diagup \\ \text{—C}_6\text{H}_3\text{—N} \\ \diagdown \\ \text{CH}_2\text{—CH}_2\text{—CH}_2\text{—SO}_3\text{H} \end{array}$$

with $SO_2$—$CH_2$—$CH_2$—$OSO_3H$ substituent

| No. | Diazo component (—N=N—K) | Shade on cotton |
|---|---|---|
| 46 | 2-(phenylsulfonyl)phenyl | yellow |
| 47 | 4-(phenylsulfonyl)phenyl | yellow |
| 48 | 4-(phenylcarbamoyl)phenyl | yellow |
| 49 | 3-cyanophenyl | yellow |
| 50 | 3-(trifluoromethyl)phenyl | yellow |
| 51 | 2-chloro-4-(trifluoromethyl)phenyl | yellow |
| 52 | 4-chloro-2-(trifluoromethyl)phenyl | yellow |
| 53 | 2,4,5-trichlorophenyl | orange |
| 54 | 4-(2-sulfatoethylsulfonyl)phenyl (HO$_3$S—O—C$_2$H$_4$—O$_2$S—C$_6$H$_4$—) | yellow |

TABLE V-continued $$K = -\bigcirc-N\begin{matrix}CH_2-CH_2-CH_2-SO_2H\\ CH_2-CH_2-CH_2-SO_3H\end{matrix}$$

$$SO_2-CH_2-CH_2-OSO_3H$$

| No. | (structure) | Shade on cotton |
|---|---|---|
| 55 | HO₃S—O—C₂H₄—O₂S—⟨C₆H₃(Br)⟩—N=N—K | orange |
| 56 | ⟨C₆H₄(SO₂—C₂H₄—OSO₃H)⟩—N=N—K | yellow |
| 57 | HO₃S—O—C₂H₄—O₂S—⟨C₆H₂(SO₂—C₂H₄—OSO₃H)(Cl)⟩—N=N—K | red |
| 58 | HO₃S—O—C₂H₄—O₂S—⟨C₆H₃(SO₂—C₂H₄—OSO₃H)⟩—N=N—K | red |
| 59 | 5,6-dichlorobenzothiazol-2-yl—N=N—K | red |
| 60 | 6,7-dichlorobenzothiazol-2-yl—N=N—K | red |
| 61 | 4,6-dibromobenzisothiazol-3-yl—N=N—K | red |
| 62 | 5-(n-C₄H₉—S)-1,3,4-thiadiazol-2-yl—N=N—K | red |
| 63 | 2-phenyl-1,3,4-thiadiazol-5-yl—N=N—K | red |

EXAMPLE 9

A mixture of 20.1 g of 3-aminophenyloxaethylsulfone, 40 ml of acetic acid and 22.1 g of epichlorohydrin is stirred for 10 hours at a temperature of 40°–42° C. and then diluted with water to an acetic acid concentration of 80%. A solution which contains the coupling component of the formula

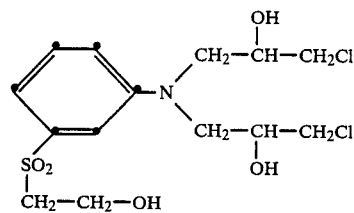

and which can be used for azo coupling reactions is obtained. After it has been isolated, this compound can be converted in known manner into the trisulfo ester.

The dyes listed in Table VI are obtained from this coupling component by azo coupling and sulfation, and they produce light- and wetfast dyeings on cotton when applied by the dyeing methods conventionally employed for vinylsulfone dyes.

TABLE V-continued $$K = \underset{\underset{CH_2-CH_2-OSO_3H}{SO_2}}{\overset{\overset{OSO_3H}{CH_2-CH-CH_2-Cl}}{\underset{\overset{|}{CH_2-CH-CH_2-Cl}}{\underset{|}{OSO_3H}}}}{\phantom{-}}N\phantom{-}$$

| No. | Structure | Shade on cotton |
|---|---|---|
| 13 | H₃C—O₂S—(2,5-Br₂-phenyl)—N=N—K | orange |
| 14 | (H₅C₂)₂NO₂S—(2,5-Br₂-phenyl)—N=N—K | orange |
| 15 | 2-Cl-4-(SO₂N(C₂H₅)₂)-phenyl—N=N—K | yellow |
| 16 | phenyl-NHOC—phenyl—N=N—K | yellow |
| 17 | 3-CF₃-phenyl—N=N—K | yellow |
| 18 | 2-Cl-3-CF₃-phenyl—N=N—K | yellow |
| 19 | 2-Cl-5-CF₃-phenyl—N=N—K | yellow |
| 20 | 2,4,6-Cl₃-phenyl—N=N—K | orange |
| 21 | 2,4-Cl₂-phenyl—N=N—K | yellow |
| 22 | 2,3-Cl₂-phenyl—N=N—K | yellow |
| 23 | benzothiazol-2-yl—N=N—K | red |
| 24 | 5,6-Cl₂-benzothiazol-2-yl—N=N—K | red |
| 25 | 4,5-Cl₂-benzothiazol-2-yl—N=N—K | red |
| 26 | benzisothiazol-3-yl—N=N—K | red |
| 27 | 5-(C₂H₅-S)-1,3,4-thiadiazol-2-yl—N=N—K | red |
| 28 | phenyl-fused thiadiazole—N=N—K | red |

Dyeing Procedure I 2 parts of the dye obtained in Example 4 are dissolved in 100 parts of water while adding 0.5 part of sodium m-nitrobenzenesulfonate. A cotton fabric is impregnated with this solution to a liquor pick-up of 75% and then dried.

The fabric is then impregnated with a warm solution of 20° C. which contains 4 g/l of sodium hydroxide and 300 g/l of sodium chloride, and then expressed to a pick-up of 75%. The dyeing is steamed for 30 seconds at 100° to 120° C., rinsed, soaped for a quarter of an hour in a 0.3% boiling solution of a non-ionic detergent, then rinsed and dried.

Dyeing Procedure II 2 parts of the dye obtained in Example 4 are dissolved in 400 parts of water. To this solution are added 1500 parts of a solution containing 53 g/l of sodium chloride and 100 parts of a cotton fabric are put into this dyebath at 40° C. After 45 minutes 100 parts of a solution containing 16 g/l of sodium hydroxide and 20 g/l of calcined sodium carbonate are added. The temperature of the dyebath is kept for 45 minutes at 40° C. The dyed fabric is then rinsed, soaped for 15 minutes at the boil with a non-ionic detergent, rinsed once more and dried.

Dyeing Procedure III 4 parts of the dye obtained in Example 4 are dissolved in 50 parts of water. To this solution are added 50 parts of a solution which contains 5 g/l of sodium hydroxide and 20 g/l of calcined sodium carbonate. A cotton fabric is padded with this liquor to a pick-up of 70% and then rolled up. The cotton fabric is then stored for 3 hours at room temperature. The dyed goods are then rinsed, soaped at the boil for ¼ hour with a non-ionic detergent rinsed once more, and dried.

Printing Procedure 3 parts of the dye obtained according to Example 4 are sprinkled, with rapid stirring, into 100 parts of a stock thickening which contains 50 parts of 5% sodium alginate thickening, 27.8 parts of water, 20 parts of urea, 1 part of sodium m-nitrobenzenesulfonate and 1.2 parts of sodium bicarbonate.

A cotton fabric is printed with the printing paste so obtained and dried. The printed fabric is steamed for 2 minutes at 102° C. in saturated steam, then rinsed, if necessary soaped at the boil, then rinced once more and subsequently dried.

What is claimed is:

1. A reactive dye of the formula

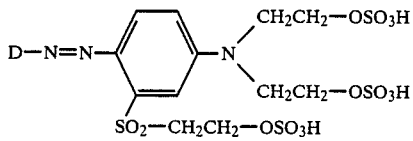

wherein D is the radical of a benzene, anthraquinone or heterocyclic diazo component.

2. A reactive dye according to claim 1, wherein D is the radical of an anthraquinone diazo component.

3. A reactive dye according to claim 2, wherein D is 1-anthraquinonyl.

4. A reactive dye according to claim 1, wherein D is the radical of a phthalimide, benzthiazole, benzisothiazole, thiadiazole or phthalohydrazide diazo component.

5. A reactive dye according to claim 4, wherein D is a radical selected from the groups consisting of (1) N-cyclohexylphthalimide-3- or -4-yl, (2) benzthiazol-2-yl in which the benzene ring is unsubstituted or substituted by $C_1$–$C_4$alkylsulfonyl or halogen, (3) benzthiazol-5- or -6-yl which is in the 2-position unsubstituted or substituted by $C_1$–$C_4$-alkylsulfonyl, (4) 2,1-benzisothiazol-3-yl in which the benzene ring is unsubstituted or substituted by halogen, nitro or sulfo, (5) 1,3,4-thiadiazol-5-yl which is in the 2-position unsubstituted or substituted by phenyl, $C_1$–$C_4$-alkylthio, benzylthio or β-sulfatoethylthio, (6) 1,2,4-thiadiazol-5-yl which is in the 3-position unsubstituted or substituted by phenyl or sulfophenyl, or (7) 5-, 6-, 7- or 8-phthalohydrazide in which one nitrogen atom is unsubstituted or substituted by phenyl.

6. A reactive dye according to claim 1, of the formula

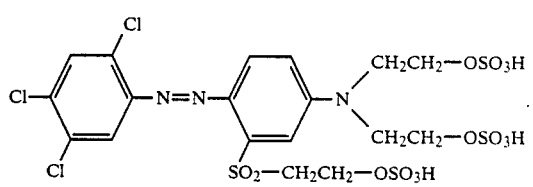

7. A reactive dye according to claim 1, of the formula

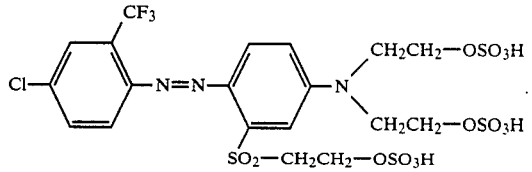

* * * * *